(12) United States Patent
Milvich

(10) Patent No.: US 6,720,760 B2
(45) Date of Patent: Apr. 13, 2004

(54) INDUCED CURRENT POSITION TRANSDUCERS HAVING IMPROVED SCALE LOOP STRUCTURES

(75) Inventor: Michelle M. Milvich, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/987,400

(22) Filed: Nov. 14, 2001

(65) Prior Publication Data

US 2003/0090264 A1 May 15, 2003

(51) Int. Cl.⁷ .............................. G01B 7/02; G01B 7/14; G01D 5/20
(52) U.S. Cl. .......................... 324/207.17; 324/207.24; 324/207.25; 336/45; 336/129; 340/870.32
(58) Field of Search .......... 324/207.12, 207.15–207.19, 324/207.24, 207.25, 239–243; 336/45, 73, 75, 77, 79, 115, 129; 340/870.32, 870.34–870.36

(56) References Cited

U.S. PATENT DOCUMENTS

| 4,853,684 | A | | 8/1989 | Hoppstadter |
| 5,336,997 | A | * | 8/1994 | Anim-Appiah et al. 324/207.16 |
| 5,751,146 | A | | 5/1998 | Hrovat |
| 5,804,963 | A | | 9/1998 | Meyer |
| 5,973,494 | A | | 10/1999 | Masreliez et al. |
| 6,005,387 | A | | 12/1999 | Andermo et al. |
| 6,011,389 | A | | 1/2000 | Masreliez et al. |
| 6,252,398 | B1 | * | 6/2001 | Goldfine et al. ............ 324/239 |
| 6,259,249 | B1 | | 7/2001 | Miyata |
| 2002/0097043 | A1 | | 7/2002 | Sasaki et al. |

FOREIGN PATENT DOCUMENTS

EP 0872712 A 10/1998

* cited by examiner

Primary Examiner—Gerard R. Strecker
(74) Attorney, Agent, or Firm—Oliff & Berridge, PLC

(57) ABSTRACT

A scale loop formed by a loop trace of electrically conductive material is usable in an induced current position transducer. The scale loop is continuous and has a particular shape depending on the configuration of the induced current position transducer. The scale loop is not in contact with other highly conductive materials. The dimensions of the cross-section of the conducting trace are chosen to increase the transfer of energy through the transducer.

27 Claims, 10 Drawing Sheets

INDUCED CURRENT POSITION TRANSDUCERS HAVING IMPROVED SCALE LOOP STRUCTURES

BACKGROUND OF THE INVENTION

1. Field of Invention

This invention relates to induced current linear and rotary position transducers.

2. Description of Related Art

Various induced current position transducers are known. U.S. Pat. No. 5,973,494, incorporated herein by reference in its entirety, discloses an electronic caliper using an induced current position transducer. U.S. Pat. No. 6,005,387, incorporated herein by reference in its entirety, discloses various reduced-offset high accuracy induced current position transducers and associated signal processing techniques. U.S. application Ser. No. 09/421,497, now U.S. Pat. No. 6,400,138, incorporated herein by reference in its entirety, discloses various reduced-offset high accuracy induced current absolute position transducers and associated signal processing techniques.

A reduced-offset-type induced current position transducer generally includes a transmitter winding, a corresponding receiver winding and a signal generating and processing circuit on a readhead. Reduced-offset-type induced current position transducers are often configured so that the transmitter winding and the corresponding receiver winding occupy separate regions on the readhead. The transmitter winding and the corresponding receiver winding are spaced apart in a direction transverse to the measuring axis of the position transducer. The transducer also includes a scale having at least one scale loop. The transmitter winding is inductively coupled to a first portion of the scale loop and a second portion of the scale loop is, in turn, inductively coupled to the corresponding receiver winding.

When a time-varying signal originating from the signal generating and processing circuit passes through the transmitter winding, a primary magnetic field is generated. The transmitter winding is inductively coupled to the first portions of the scale loops by the primary magnetic field. The second portions of the scale loops generate secondary magnetic fields. The receiver winding is inductively coupled to the second portions of the scale loops by the secondary magnetic fields.

At least one of the transmitter winding or the receiver winding is formed in a periodic pattern, such as a sinusoidal pattern, having dimensions corresponding to the coupling loops. Various winding configurations are known in the art to reduce the extraneous inductive coupling in the device. The receiver windings inductively couple with the second loop portions of the scale loops in differing degrees, depending on the position of the scale relative to the readhead.

U.S. Pat. No. 6,011,389, incorporated herein by reference in its entirety, discloses an incremental induced current position transducer. U.S. Pat. Nos. 5,804,963, 4,853,684 and 6,259,249 disclose various other types of induced current position transducers. The '389, '963, '684 and '249 patents include scale configurations wherein periodically arranged scale elements, in some embodiments, comprise conductive loops. However, these patents include no teaching directed toward the size of the conductors comprising the conductive scale loops.

Furthermore, the conductor sizes represented in the drawings are inconsistent and/or artifacts of the illustration process. Furthermore, the transmitter and receiver windings of the aforementioned patents are either not spaced apart in a direction transverse to the measuring axis of their respective induced current position transducers, or their underlying operating principle is otherwise significantly different from that associated with the present invention. For at least these reasons, the '389, '963, '684 and '249 patents are not instructive regarding scale loop designs according to this invention.

It is desirable for the position measurements obtained with reduced-offset-type induced current position transducers to have improved accuracy and resolution relative to the accuracy and resolution that are possible with known devices.

SUMMARY OF THE INVENTION

The accuracy and resolution of measurements taken with reduced offset-type induced position transducers are generally related to the signal strength provided by the transducer and the related signal-to-noise ratio of the overall position transducer signal processing. The signal strength is, in turn, related to the efficiency of the scale loops in inductively coupling to the transmitter and receiver windings of the reduced-offset-type induced current position transducer. Therefore, the coupling efficiency of the scale loops is an important factor in such transducer designs.

The resolution of measurements taken with reduced-offset-type induced current position transducers is improved when the spatial period or wavelength of the spatially varying magnetic field created by the scale loops is short, and when the signal measured by the receiver has a high signal-to-noise ratio. However, as the spatial period or wavelength of the magnetic field created by the scale loops is shortened by reducing the dimensions of the scale loops along the measuring axis, the signal provided by the scale loops is generally weaker at a given operating distance away from the scale loops. Further, fabricating the scale generally becomes more expensive as the dimensions of the scale loops are reduced.

Accordingly, there is a need for improved scale loop designs that help to improve performance and reduce fabrication costs of induced current position transducers.

The signal-to-noise ratio of the signal produced by the scale loops in a reduced-offset-type induced current position transducer depends significantly on the efficiency of the transfer of energy through the scale loops. The efficiency of the transfer of energy through the scale loops generally improves by decreasing the resistance and increasing the inherent inductance of the scale loops. These factors can be affected by manipulating the layout of the scale loops and the cross-sectional dimensions of the scale traces that individually form each of the scale loops.

However, scale loop design constraints are imposed by factors such as the desired scale wavelength and the desired overall dimensions of the scale and the readhead of the reduced offset-type induced position transducer. In particular, when a desired design constrains the distance spanned by a scale loop along the measuring axis, a balance must be achieved between the width of the scale trace, which is representative of the resistance,and the interior area of the scale loop, which is representative of the inherent inductance. Thus, an optimum scale loop design must consider the relationship between these parameters, as well as other practical fabrication considerations.

The resistance of a scale loop, is dependent on the geometry of the scale trace from which the scale loop is formed. In particular, the resistance of the scale loop is dependent on the thickness and width of the scale trace, as well as its length. Additionally, the effective resistance of an operating scale loop also depends on the skin depth of the scale trace. The skin depth, in turn, depends on the material from which the scale trace is formed, and the operating frequency of the reduced offset-type inductive position transducer.

The inherent inductance of a scale loop depends primarily on the interior area of the scale loop. In particular, as the interior area of a scale loop is reduced, the inherent inductance of the scale loop is also reduced. As previously discussed, when the distance spanned by a scale loop along the measuring axis is constrained by other design imperatives, the interior area, and thus the inherent inductance, of a scale loop necessarily decreases as the width of the scale trace. Thus, to improve the related performance of the scale loops in a reduced offset-type induced current position transducer, the width of the scale trace forming the scale loop should be chosen to balance the need to minimize the resistance against the need to maintain a high inherent inductance.

Accordingly, this invention provides efficient scale loops that provide increased signal strength and improved resolution and accuracy of measurements, when employed in reduced offset-type induced current position transducers.

This invention separately provides scale loops of reduced-offset-type induced current position transducers, having reduced electrical resistance.

This invention separately provides scale loops of reduced-offset-type induced current position transducers, having improved inherent inductance in relation to their resistance.

Scale loops for reduced-offset induced current position transducers are provided which allow high resolution position measurements to be made. The scale loops designed according to this invention include a scale trace formed of an electrically conductive material arranged in a loop that is continuous and electrically isolated from adjacent scale loops. The shape of the scale loop is not limited, but rather is determined by the particular configuration of the reduced offset-type induced current position transducer in which the scale loop will be employed.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
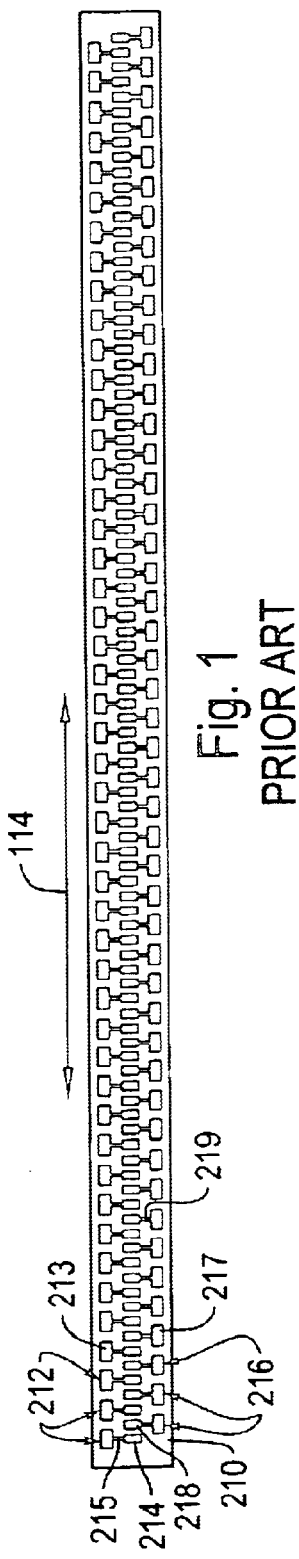
FIG. 1 is a known reduced-offset scale for use in an induced current position transducer.

FIG. 1 illustrates an exemplary embodiment of a reduced-offset scale. As shown in FIG. 1, the reduced-offset scale 210 includes a first plurality of closed-loop scale loops 212 interleaved with a second plurality of closed-loop scale loops 216.

Each of the first plurality of scale loops 212 includes a first loop portion 213 and a second loop portion 214 connected by a pair of connecting conductors 215. Similarly, each of the second plurality of scale loops 216 includes a first loop portion 217 and a second loop portion 218 connected by a pair of connecting conductors 219.

In the first plurality of scale loops 212, the first loop portions 213 are arranged along one lateral edge of the scale 210 and are arrayed along a measuring axis 114. The second loop portions 214 are arranged along the center of the scale 210 and are arrayed along the measuring axis 114. The connecting conductors 215 extend perpendicularly to the measuring axis 114 to connect the first loop portions 213 to the second loop portions 214.

Similarly, in the second plurality of scale loops 216, the first loop portions 217 are arranged along a second lateral edge of the scale 210 and arrayed along the measuring axis 114. The second loop portions 218 are arranged along the center of the scale 210 along the measuring axis, interleaved with the second loop portions 214 of scale loops 212. The connecting conductors 219 extend generally perpendicularly to the measuring axis 114 to connect the first loop portions 217 to the second loop portions 218.

Figure 2:
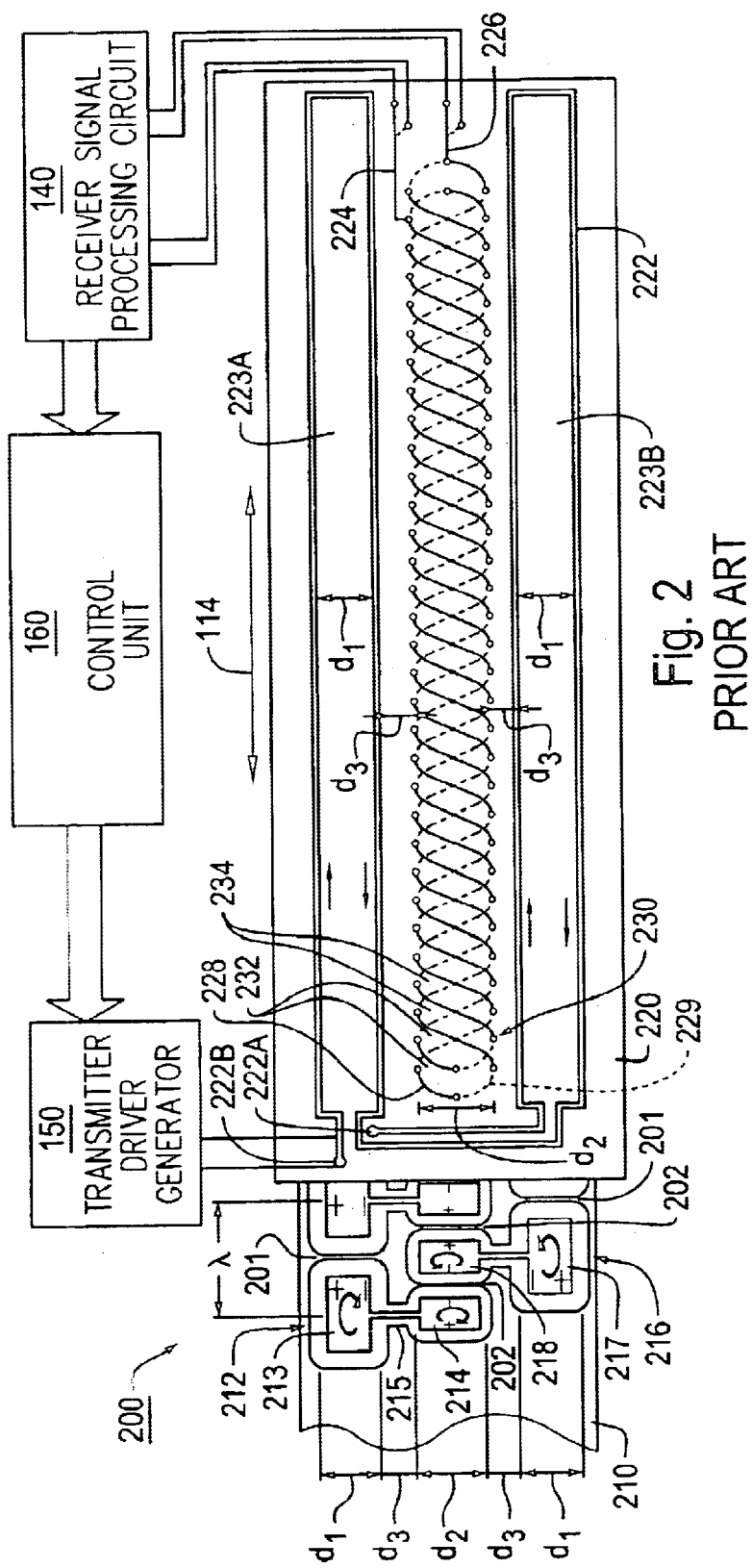
FIG. 2 is a known reduced-offset-type induced current position transducer.

FIG. 2 illustrates an exemplary embodiment of an induced current position transducer 200 that includes the reduced-offset scale 210. As shown in FIG. 2, a readhead 220 of the transducer 200 includes a transmitter winding 222 having a first transmitter winding portion 223A and a second transmitter winding portion 223B. As shown in FIG. 2, the first transmitter winding portion 223A is provided at a first lateral edge of the readhead 220, while the second transmitter winding portion 223B is provided at the other lateral edge of the readhead 220. Each of the first and second transmitter winding portions 223A and 223B have the same long dimension extending along the measuring axis 114. Furthermore, each of the first and second transmitter winding portions 223A and 223B have a short dimension that extends in a direction perpendicular to the measuring axis 114 a distance $d_1$.

The terminals 222A and 222B of the transmitter winding 222 are connected to the transmitter drive signal generator 150. The transmitter drive signal generator 150 outputs a time-varying drive signal to the transmitter winding terminal 222A. Thus, a time-varying current flows through the transmitter winding 222 from the transmitter winding terminal 222A to the transmitter terminal 222B, as indicated in FIG. 2.

In response, the first transmitter winding portion 223A generates a primary magnetic field that rises up out of the plane of FIG. 2 inside the first transmitter winding portion 223A and descends into the plane of FIG. 2 outside the loop formed by the first transmitter winding portion 223A. In contrast, the second transmitter winding portion 223B generates a primary magnetic field that rises out of the plane of FIG. 2 outside the loop formed by the second transmitter winding portion 223B and descends into the plane of FIG. 2 inside the loop formed by the second transmitter winding portion 223B. In response, a current is induced in the scale loops 212 and 216 that counteracts the change of magnetic field.

Thus, the induced current in each of the scale loop sections 213 and 217 flows in a direction opposite to the current flowing in the respective adjacent portions of the transmitter loops 223A and 223B. As shown in FIG. 2, adjacent ones of the second loop portions 214 and 218 in the center section of the scale have loop currents having opposite polarities. Thus, a secondary magnetic field is created having field portions of opposite polarity periodically distributed along the center section of the scale. The wavelength λ of the periodic secondary magnetic field is equal to the distance between successive second loop portions 214 (or 218).

The readhead 220 also includes first and second receiver windings 224 and 226. The first and second receiver windings 224 and 226 are each formed by a plurality of sinusoidally shaped loop segments 228 and 229 formed on opposite sides of an insulating layer of the printed circuit board forming the readhead 220. The loop segments 228 and 229 are linked through feed-throughs 230 to form alternating positive polarity loops 232 and negative polarity loops 234 in each of the first and second receiver windings 222 and 226. The receiver windings 224 and 226 are positioned in the center of the readhead 220 between the first and second transmitter portions 223A and 223B. Each of the first and second receiver windings 224 and 226 extends in the direction perpendicular to the measuring axis a distance $d_2$. The first and second receiver windings 224 and 226 are spaced equal distances $d_3$ from the inner portions of the first and second transmitter winding portions 223A and 223B.

The loops 232 and 234 in each of the first and second receiver windings 224 and 226 have a width along the measuring axis 114 equal to λ/2. Thus, each pair of adjacent loops 232 and 234 has a width equal to λ. Furthermore, the first and second loop segments 228 and 229 go through a full sinusoidal cycle in each pair of adjacent loops 232 and 234. Thus, λ corresponds to the sinusoidal wavelength, that is, the spatial period of the first and second receiver windings 224 and 226. Furthermore, the receiver winding 226 is offset by λ/4 from the first receiver winding 224 along the measuring axis 114. That is, the first and second receiver windings 224 and 226 are in quadrature.

The changing drive signal from the transmitter driver generator 150 is applied to the transmitter winding 222 such that current flows in the transmitter winding 222 from a first terminal 222A, through the transmitter winding 222 and out through a second terminal 222B. Thus, the magnetic field generated by the transmitter winding 222 descends into the plane of FIG. 1 within the transmitter winding 222 and rises up out of the plane of FIG. 1 outside the transmitter winding 222. Accordingly, the changing magnetic field within the transmitter winding 222 generates an induced electromotive force (EMF) in each of the loops 232 and 234 formed in the receiver windings 224 and 226.

The loops 232 and 234 have opposite winding directions. Thus, the EMF induced in the loops 232 has a polarity that is opposite to the polarity of the EMF induced in the loops 234. The loops 232 and 234 enclose the same size areas and thus nominally the same amount of magnetic flux. Therefore, the absolute magnitude of the EMF generated in each of the loops 232 and 234 is nominally the same.

There are preferably equal numbers of loops 232 and 234 in each of the first and second receiver windings 224 and 226. Ideally, the positive polarity EMF induced in the loops 232 is exactly offset by the negative polarity EMF induced in the loops 234. Accordingly, the net nominal EMF on each of the first and second receiver windings 224 and 226 is zero and it is intended that no signal is output from the first and second receiver windings 224 and 226 as a result solely of the direct coupling from the transmitter winding 222 to the receiver windings 224 and 226.

Each of the first plurality of scale loops 212 is arranged at a pitch equal to a wavelength λ of the first and second receiver windings 224 and 226. Furthermore, the first loop portions 213 each extends a distance along the measuring axis 114 which is as close as possible to the wavelength λ while still providing the insulating spaces 201 between adjacent ones of the first loop portions 213. In addition, the first loop portions 213 extend the distance $d_1$ in the direction perpendicular to the measuring axis 114.

Similarly, each of the second plurality of scale loops 216 is also arranged at a pitch equal to the wavelength λ. The first loop portions 217 also extend as close as possible to each other along the measuring axis to the wavelength λ while providing the spaces 201 between adjacent ones of the first loop portions 217. The first loop portions 217 also extend the distance $d_1$ in the direction perpendicular to the measuring axis 114.

The second loop portions 214 and 218 of the first and second pluralities of scale loops 212 and 216 are also arranged at a pitch equal to the wavelength λ. However, each of the second loop portions 214 and 218 extends along the measuring axis as close as possible to only one-half the wavelength λ. An insulating space 202 is provided between each adjacent pair of second loop portions 214 and 218 of the first and second pluralities of scale loops 212 and 216, as shown in FIG. 2. Thus, the second loop portions 214 and 218 of the first and second pluralities of scale loops 212 and 216 are interleaved along the length of the scale 210. Finally, each of the second loop portions 214 and 218 extends the distance $d_2$ in the direction perpendicular to the measuring axis 114.

As shown in FIG. 2, the second loop portions 214 and 218 are spaced the distance $d_3$ from the corresponding first loop portions 213 and 217. Accordingly, when the read head 220 is placed in proximity to the scale 210, as shown in FIG. 2, the first transmitter winding portion 223A aligns with the first loop portions 213 of the first plurality of scale loops 212. Similarly, the second transmitter winding portion 223B aligns with the first loop portions 217 of the second plurality of scale loops 216. Finally, the first and second receiver windings 224 and 226 align with the second loop portions 214 and 218 of the first and second scale loops 212 and 216.

In operation, a time-varying drive signal is output by the transmitter drive signal generator 150 to the transmitter winding terminal 222A. Thus, the first transmitter winding portion 223A generates a first changing magnetic field having a first direction while the second transmitter winding portion 223B generates a second magnetic field in a second direction that is opposite to the first direction. This second magnetic field has a field strength that is equal to a field strength of the first magnetic field generated by the first transmitter winding portion 223A.

Each of the first plurality of scale loops 212 is inductively coupled to the first transmitter winding portion 223A by the first magnetic field generated by the first transmitter winding portion 223A. Thus, an induced current flows clockwise through each of the first plurality of scale loops 212. At the same time, the second plurality of scale loops 216 is inductively coupled to the second transmitter winding portion 223B by the second magnetic field generated by the second transmitter winding portion 223B. This induces a counterclockwise current to flow in each of the second plurality of scale loops 216. That is, the currents through the second portions 214 and 218 of the scale loops 212 and 216 flow in opposite directions.

The clockwise flowing current in each of the second portions 214 of the first scale loops 212 generates a third magnetic field that descends into the plane of FIG. 2 within the second portions 214. In contrast, the counterclockwise flowing currents in the second loop portions 218 of the second scale loops 216 generate a fourth magnetic field that rises out of the plane of FIG. 2 within the second loop portions 218 of the second scale loops 216. Thus, a net alternating magnetic field is formed along the measuring axis 114. This net alternating magnetic field has a wavelength which is equal to the wavelength λ of the first and second receiver windings 224 and 226.

Accordingly, when the positive polarity loops 232 of the first receiver winding 224 are aligned with either the second loop portions 214 or 218, the negative polarity loops 234 of the first receiver winding 224 are aligned with the other of the second loop portions 214 or 218. This is also true when the positive polarity loops 232 and the negative polarity loops 234 of the second receiver winding 226 are aligned with the second loop portions 214 and 218. Because the alternating magnetic field generated by the second loop portions 214 and 218 is spatially modulated at the same wavelength as the spatial modulation of the first and second receiver windings 214 and 216, the EMF generated in each of the positive and negative polarity loops 232 and 234 when aligned with the second loop portions 214 is equal and opposite to the EMF generated when they are aligned with the second loop portions 218.

Thus, the net output of the positive polarity loops 232, as the readhead 220 moves relative to the scale 210 is a sinusoidal function of the position "x" of the read-head along the scale and the offset component of the output signal due to extraneous scale is nominally zero. Similarly, the net output from the negative polarity loops 234, as the readhead 220 moves relative to the scale 210, is also a sinusoidal function of the position "x" of the readhead along the scale and the offset component of the output signal due to extraneous scale is nominally zero. The EMF contributions from the positive polarity loops 232 and the negative polarity loops 234 are in phase.

Finally, the first and second receiver windings 224 and 226 are in quadrature. Thus, the output signal generated by the first receiver winding 224 as a function of x and output to the receiver signal processing circuit 140 is 90° out of phase with the signal output by the second receiver winding 226 as a function of x to the receiver signal processing circuit 140.

The receiver signal processing circuit 140 inputs and samples the output signals from the first and second receiver windings 224 and 226, converts these signals to digital values and outputs them to the control unit 160. The control unit 160 processes these digitized output signals to determine the relative position x between the readhead 220 and the scale 210 within a wavelength λ.

Based on the nature of the quadrature output from the first and second receiver windings 224 and 226, the control unit 160 is able to determine the direction of relative motion between the readhead 220 and the scale 210. The control unit 160 counts the number of partial or full "incremental" wavelengths λ traversed, by signal processing methods well-known to those skilled in the art and disclosed herein and in the incorporated references. The control unit 160 uses that number and the relative position within a wavelength λ to output the relative position between the readhead 220 and the scale 210 from a set origin.

The control unit 160 also outputs control signals to the transmitter drive signal generator 150 to generate the time-varying transmitter drive signal. It should be appreciated that any of the signal generating and processing circuits shown in the incorporated references can be used to implement the receiver signal processing circuit 140, the transmitter drive signal generator 150 and the control unit 160. Thus, these circuits will not be described in further detail herein.

Figure 3:
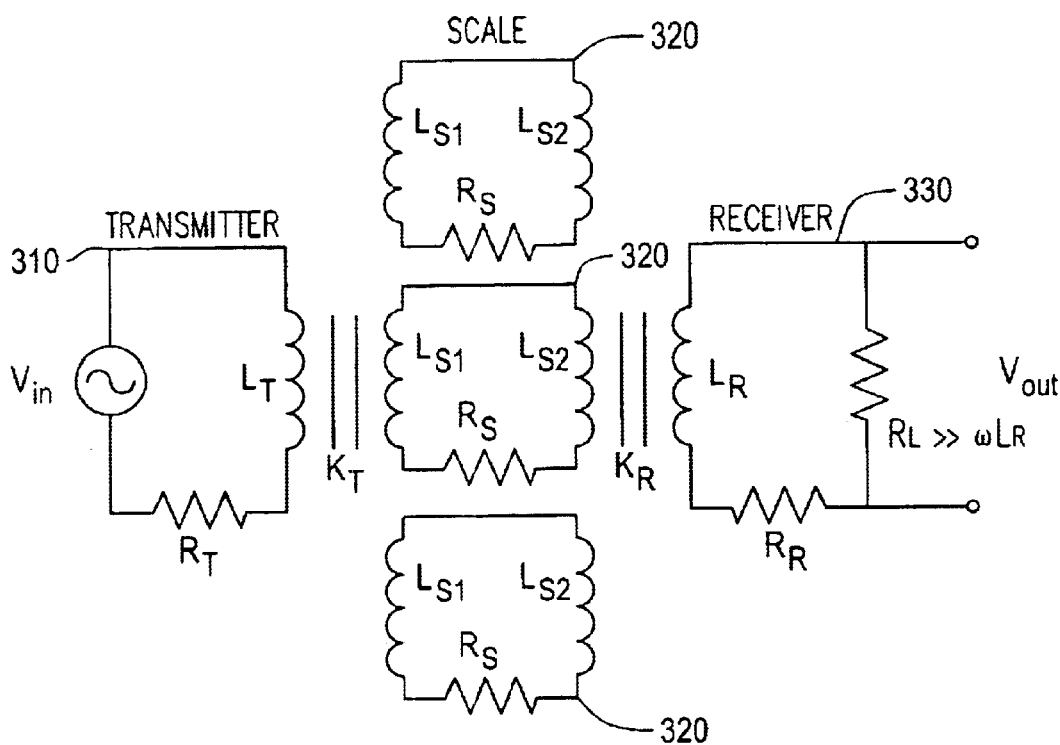
FIG. 3 is a schematic diagram of a simplified equivalent circuit of an induced current position transducer.

As discussed above, high resolution position measurements are desirable, and can be achieved by shortening the spatial period of the time-varying magnetic field created by a scale of an induced current position transducer and increasing the signal-to-noise ratio. The signal-to-noise ratio depends significantly on the efficiency of the transfer of energy through the scale loops 212 formed on the scale 210. FIG. 3 illustrates a simplified equivalent circuit for a typical reduced-offset-type induced current position transducer, such as the reduced-offset transducer 200 shown in FIG. 2. The circuit includes a transmitter loop 310, several scale loops 320, and a receiver loop 330.

The periodic nature of the position transducer is illustrated by the multiple scale loops 320, which approximate the scale loops found in a typical induced current position transducer, such as the positive polarity loops 212 and negative polarity loops 214 of the position transducer 200 in FIG. 2, which are spaced periodically in a pattern having a wavelength λ. It should be appreciated that, in a typical induced current position transducer, both the transmitter and receiver loops couple to a plurality of scale loops simultaneously. However, it should be understood that a configuration of a scale loop that maximizes the signal for that particular scale loop will generally maximize the combined signal from multiple scale loops if the configuration is repeated. Accordingly, the following discussion focuses on improving the signal provided by a single scale loop, for clarity.

As shown in FIG. 3, the transmitter loop 310 has an inherent inductance $L_T$ and a resistance $R_T$. The inherent inductance $L_T$ represents the inductance of a portion of the transmitter loop 310 coupled to the scale loop 320. For the transmitter loop of a typical induced current position transducer, the total inductance is approximately 10–100 nH and the resistance $R_T$ is typically in the milliohm range. However, in general, factors governing these transmitter parameters are not important to understanding the present invention, and are not discussed further herein. Similarly, the receiver loop 330 has an inherent inductance $L_R$ and a resistance $R_R$. The inherent inductance $L_R$ represents the inductance of the portion of the receiver loop 300 coupled to the scale loop 320. For the receiver loop of a typical induced current position transducer, the total inductance is approximately 10–1000 nH and the resistance $R_R$ is typically in the 1–100 milliohm range. However, in general, factors governing these receiver parameters are not relevant to the present invention and are not discussed further herein. A receiver load resistance $R_L$ is shown coupled across the terminals of the receiver winding 330. The receiver load resistance $R_L$ is part of the measurement circuit that measures $V_{out}$, and is typically significantly greater than other impedances in the circuit. In various exemplary embodiments, the receiver load resistance $R_L$ is in the range of 50–500 ohms.

The scale loops 320 each have inherent inductances $L_{S1}$ and $L_{S2}$ and a resistance $R_S$. In practice, $R_S$ is reduced to the greatest extent possible under practical fabrication constraints. For example, $R_S$ may be in the range of 0.01–1 milliohm. The inherent inductance $L_{S1}$ is the inductance of a portion of the scale loop 320 coupled to the transmitter winding 310 and the inherent inductance $L_{S2}$ is the inductance of a portion of the scale loop 320 coupled to the receiver winding 330. In practice, it is often desirable that $L_{S1}$ and $L_{S2}$ are approximately equal in order to maximize the transfer of energy from the transmitter winding 310 to the receiver winding 330.

Figure 9:
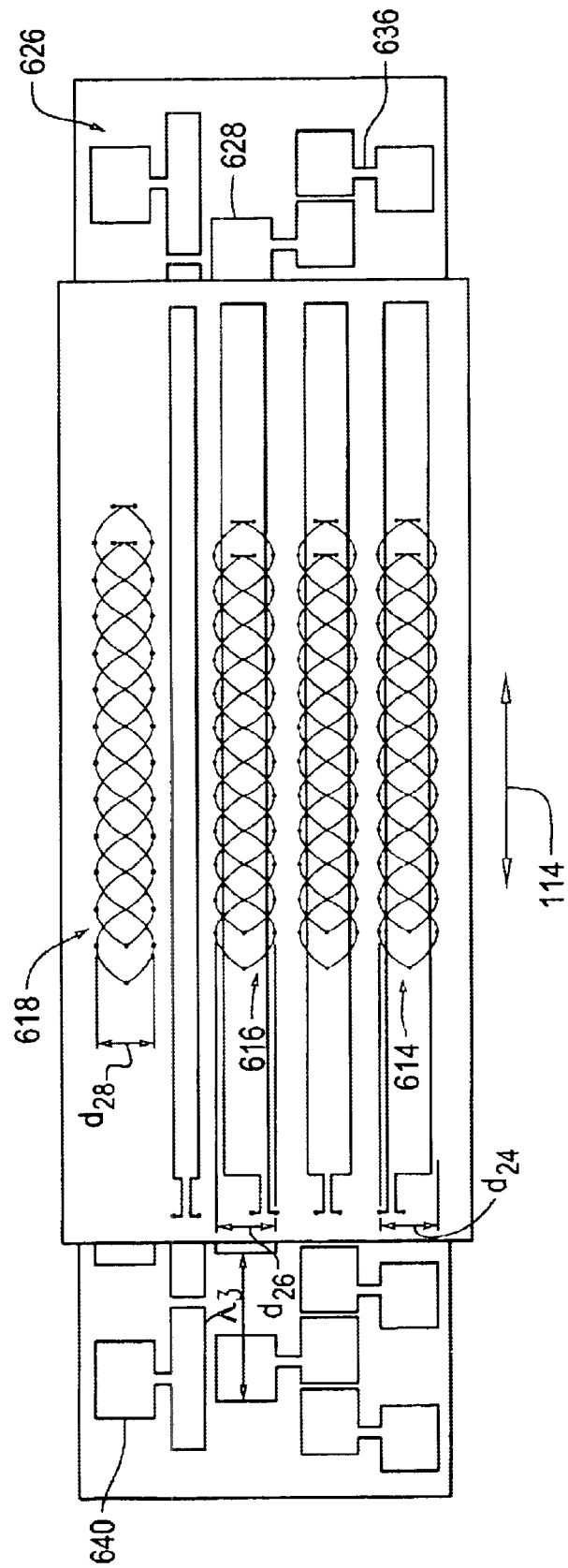
FIG. 9 is a known reduced-offset-type induced current absolute position transducer.

Further, in known induced current position transducers, such as that shown in FIG. 9 and described in the incorporated '497 application, in scale loops having multiple portions, each scale loop portion can be coupled to either a transmitter winding or a receiver winding at various times during operation to produce two signals having two different spatial periods from the same scale track. Thus, an approximately symmetrical scale loop is appropriate for operation in such inductive position transducer configurations. Thus, while scale loops having asymmetrical inductance with the transmitter and receiver loops are encompassed by this invention, the following description is simplified by assuming that $L_{S1}$ equals $L_{S2}$ and $L_S$ equals either $L_{S1}$ or $L_{S2}$.

As shown in FIG. 3, a first parameter $k_T$ is a factor indicating the strength of the inductive coupling between the transmitter winding and a scale loop, and may be considered a constant, independent of position, when a scale loop is operationally positioned relative to the transmitter winding. A second parameter $k_R$ is a factor indicating the strength of the inductive coupling between the receiver winding and a scale loop, and may be considered a periodic function of position when a scale loop is operationally positioned relative to the periodic receiver winding.

When it is assumed that the resistance $R_L$ is large compared to other impedances and that one resistance $R_T$ is small compared to other impedances, the signal gain of the general circuit of FIG. 3 is given by:

$$\frac{V_{out}}{V_{in}} = k_T k_R \sqrt{\frac{L_R L_{S1}}{L_T L_{S2}}} \frac{1}{\sqrt{\left(\frac{R_S}{\omega L_{S2}}\right)^2 + \left(\frac{L_{S1}}{L_{S2}}(1-k_T^2)+1\right)^2}} \quad (1)$$

where:

$V_{in}$ is the voltage generated at the transmitter;

$V_{out}$ is the voltage detected at the receiver;

$k_T$ is a factor indicating the strength of the inductive coupling between the transmitter winding and a scale loop;

$k_R$ is a factor indicating the strength of the inductive coupling between a scale loop and the receiver winding;

$L_R$ is the inductance of the portion of the receiver loop coupled to a scale loop;

$L_T$ is the inductance of the portion of the transmitter loop coupled to a scale loop;

$R_S$ is the resistance of a scale loop;

$\omega$ is the operating frequency of the induced current position transducer;

$L_{S1}$ is the inherent of inductance of the portion of the scale loop coupled to the transmitter; and $L_{S2}$ is the inherent of inductance of the portion of the scale loop coupled to the receiver. Assuming that $L_{S1}$ and $L_{S2}$ are equal interchangeably represented by $L_S$, the signal gain of the general circuit of FIG. 3 is given by:

$$\frac{V_{out}}{V_{in}} = k_T k_R \sqrt{\frac{L_R}{L_T}} \frac{1}{\sqrt{\left(\frac{R_S}{\omega L_S}\right)^2 + (2-k_T^2)^2}} \quad (2)$$

Figure 4:
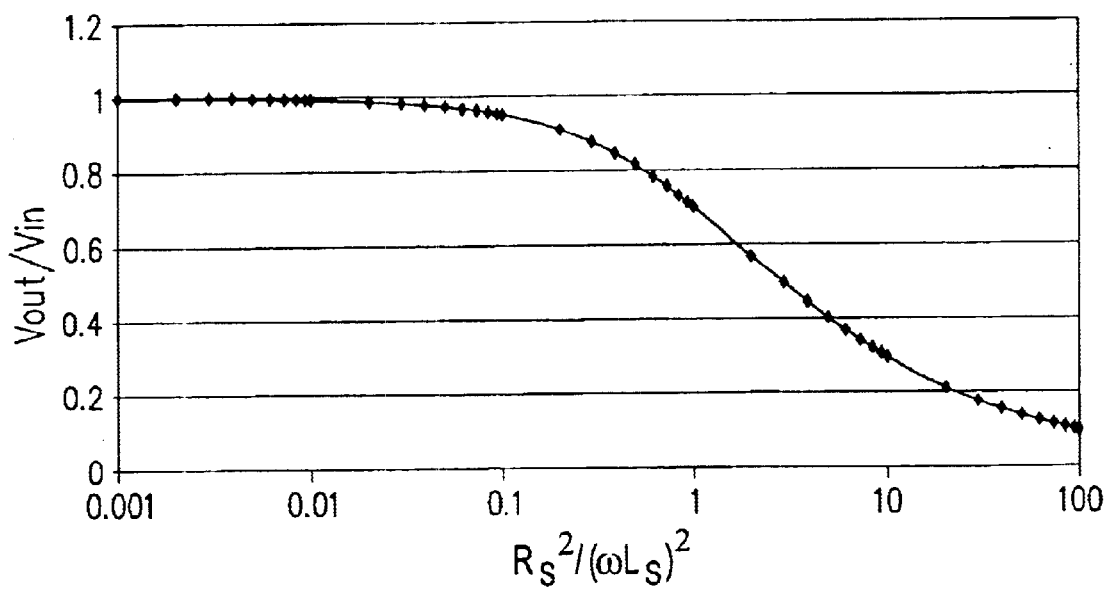
FIG. 4 is a graph showing the relationship between signal gain and the scale impedance dependent portion of the received signal of an induced current position transducer.

FIG. 4 is a graph illustrating the relationship between the signal gain and the scale impedance $(R_S^2/(\omega L_S)^2)$, as described in Equation 2. Upon inspection of Equation 2 and observation of FIG. 4, it should be appreciated that, with other factors held constant, the signal gain $V_{out}/V_{in}$ will increase as the quantity $(R_S^2/(\omega L_S)^2)$ decreases. Accordingly, to obtain an increase in the signal gain in an induced current position transducer, in various exemplary embodiments of the scale loops according to this invention, the resistance of the scale loop should be reduced without decreasing the inductance of the scale loop, or at least the resistance should be reduced to a greater extent than the inductance of the scale loop.

FIG. 4 shows, for example, that to increase the signal gain it is very useful to reduce $R_S^2$ below $(\omega L_S)^2$. FIG. 4 also shows that there is little additional improvement in signal gain when $R_S^2$ is reduced below $0.1*(\omega L_S)^2$. More generally, the information of FIG. 4 is useful for choosing a particular relation between the resistance $R_S$ and the inductance $L_S$ at a particular operating frequency ω.

However, as previously discussed, when the distance spanned by a scale loop along the measuring axis of an induced current position transducer is constrained by various design considerations, the interior area, and thus the inherent inductance, of a scale loop must decrease as the width of the scale trace increases to reduce its resistance. Thus, with due consideration of various inductive position transducer design constraints, in various exemplary embodiments, the width of the scale trace is chosen to achieve an improved relationship between the resistance $R_S$ and the inductance $L_S$ of the scale loops of an induced current position transducer.

In various exemplary embodiments, relatively planar conductive scale traces are employed. For a relatively planar scale trace in a induced current position transducer operating at higher frequencies, it is generally known or believed that the current density is largest at the surface of the scale trace and that the magnitude of electromagnetic waves within the conductor decreases exponentially as the distance from the surface of the scale trace increases. Accordingly, at a given location within the conductor, the current density also decreases exponentially as the distance from the surface of the conductor increases.

The skin depth (δ) is a well-known measure of the distance from the surface of a conductor at which the current density is generally expected to decrease to 1/e of the value of the current density at the surface. The skin depth is defined as:

$$\delta = \sqrt{\frac{2}{\sigma \mu \omega}} \quad (2)$$

where:
- δ is the skin depth of the conductor at the operating frequency of the induced current position transducer;
- σ is the conductivity of the conductor;
- μ is the magnetic permeability of the material; and
- ω describes the frequency of the oscillating wave.

In view of this relationship, at a DC frequency (i.e. ω=0), the current density will be uniform across a relatively planar scale trace cross section and will be approximately proportional to the trace thickness. However, at higher frequencies, the majority of the current will be confined to a region approximately within a skin depth δ of the surface of the scale trace, regardless of the thickness of the scale trace. The effective resistance of a scale loop formed from such a scale trace will not decrease appreciably as the thickness of the scale trace increases beyond about 1 to 3 skin depths (i.e. δ–3δ). Thus, in various exemplary embodiments of the scale loops according to this invention, a conductive scale trace forming a scale loop according to this invention has a thickness of less than about 3 skin depths (3δ). In various other exemplary embodiments, a scale trace forming a scale loop according to this invention has a thickness of less than about 1 skin depth (δ).

Further, several other relationships are evident in view of Equation 3. When a scale trace has a thickness of less than the skin depth δ, the effective resistance of the scale trace will generally significantly increase with decreasing thickness of the scale trace. As previously discussed, as the effective resistance of the scale trace increases, the signal gain will generally decrease. Furthermore, the skin depth varies with the frequency of the electric field, such that, as the operating frequency increases, the skin depth δ decreases.

Figure 5:
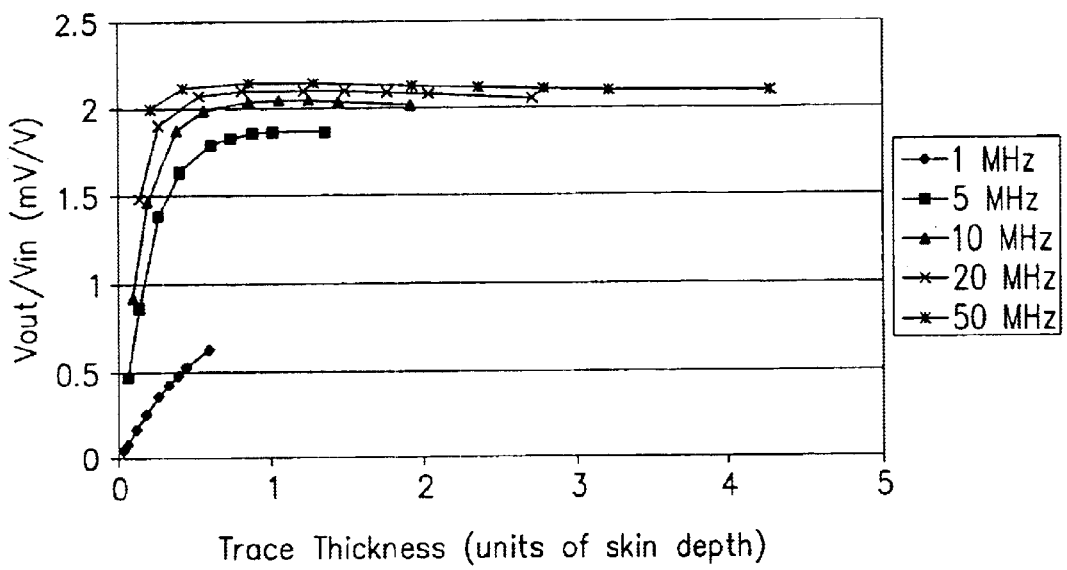
FIG. 5 is a graph showing values of signal gain in an induced current position transducer as a function of scale trace thickness.

FIG. 5 is a graph showing values of the signal gain in an induced current position transducer as a function of the scale trace thickness. The graph in FIG. 5 indicates that when other factors affecting the resistance and inductance of a loop trace are held constant, a scale trace thickness of about 1 skin depth improves the signal gain at high operating frequencies to close to a maximum value. The graph further demonstrates that an increase in the scale trace thickness up to about 3 skin depths is useful for increasing the signal gain at an operating frequency of 1 MHz.

FIG. 5 also illustrates that induced current position transducers operating at higher operating frequencies, employing scale loops with scale trace thicknesses as small as about 0.3 skin depths allow approximately 80% of the maximum possible signal to be retained. Further, no signal improvement results from increasing the loop trace thickness beyond about 1 skin depth. The inventor believes that these unexpected results may be due to the particular arrangement of conductors in an induced current position transducer giving rise to high-frequency fields which are not readily modeled or understood according to the previously-discussed simple understanding.

When fabricating scale loop traces, for example by thin film techniques or conventional printed circuit techniques, it is generally more expensive and/or less accurate to fabricate thicker traces. Thus, in various exemplary embodiments of the scale loops according to this invention, the scale loop includes a scale trace having a thickness of less than about 1.0 skin depth. In various other exemplary embodiments, the scale loops of the instant invention include scale traces having a thickness of between about 0.3 skin depths and about 1.0 skin depths.

For example, at 10 MHz, a typical operating frequency for a reduced-offset-type induced current position transducer, the skin depth of copper, a typical conductive material used to form the scale loops, is about 0.02 mm. For the reasons described above, the amount of current in a copper trace will not change significantly if the trace has a thickness that exceeds the skin depth of copper at the operating frequency of the reduced-offset-type induced current position transducer. Based on the relationships described in FIG. 5, to improve the resistance of a scale loop, it is not very effective to form the scale trace at a thickness that is significantly greater than approximately the skin depth of the scale trace material in a reduced-offset-type induced current position transducer operating at 10 MHz. Thus, in various exemplary embodiments, in a reduced-offset-type induced current position transducer operating at 10 MHz a scale loop according to this invention is formed from a copper scale trace having a relatively planar rectangular cross section and a thickness of about 0.02 mm. In various other exemplary embodiments, the scale loop of this invention is formed from a copper scale trace having a thickness of between about 0.02 mm and about 0.006 mm.

As illustrated in FIG. 5, at higher operating frequencies, the effective resistance of a scale loop will not decrease appreciably as the thickness of the scale trace is increased beyond about 1 skin depth. In such a case, it is desirable to increase the width of the scale trace in order to further decrease the resistance of the scale trace, as described below.

As previously indicated, the distance spanned by a scale loop along the measuring axis is generally constrained according to various inducted current position transducer design considerations, such as a spatial period or wavelength of the transducer. Thus, as the width of a scale trace is increased to thereby decrease its resistance, the available interior area and the associated inherent inductance of the scale loop will decrease accordingly. However, as discussed above, reduced mutual inductance between the transducer elements results in an undesirable reduction in signal gain. To address this undesirable effect, the inventors have discovered significant relationships between the width of a scale trace and the interior length along the measuring axis of the area enclosed by the scale loop, when the dimensions of the scale loop along the measuring axis are constrained by design requirements.

A known induced current position transducer that uses periodically arranged scale loops to couple transmitter and receiver windings which occupy separate regions on a readhead is commercially available in the digital Absolute Coolant Proof Caliper, Code No. 500-652, Model No. CD-6"GS, available from Mitutoyo America Corporation, Aurora, Ill. In contrast to the ratios of trace width to scale loop interior length discussed below, it should be appreciated that the comparable ratio(s) employed in the transducer of the above caliper are on the order of 0.1–0.13. Further, it should be noted that such ratios have been repeatedly used in design and manufacture of such devices. Those skilled in the art have not recognized the need to increase or otherwise specifically select ratios of trace width to interior length in the scale loops employed in comparable inductive position transducers.

Figure 6:
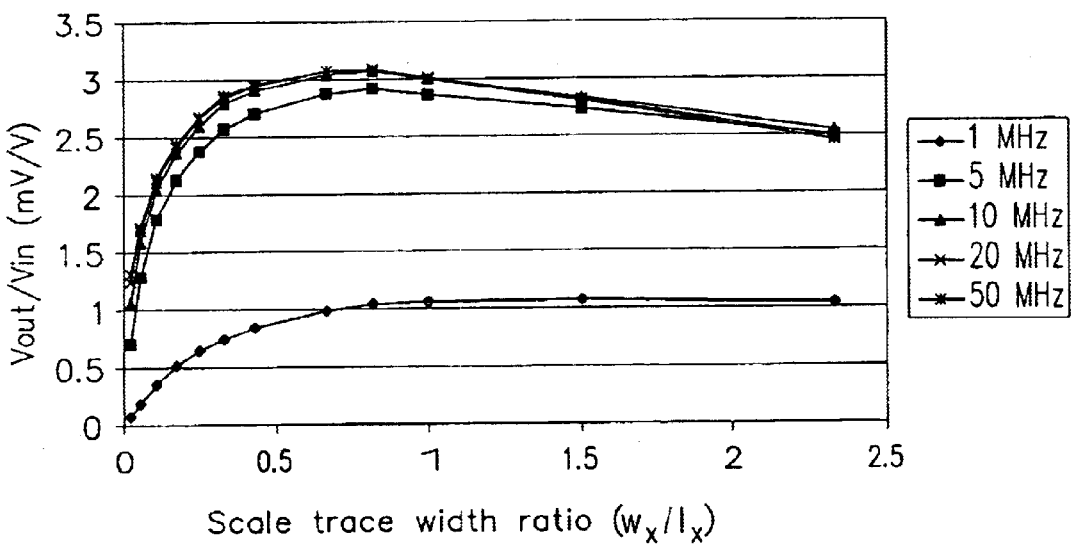
FIG. 6 is a graph showing signal gain as a function of the ratio of trace width to interior length, of a scale loop situated on a scale so that the scale trace centers are at a constrained spacing along the measuring axis of an induced current position transducer at various operating frequencies.

FIG. 6 is a graph showing the signal gain, as a function of the ratio of the trace width to the interior length, of a scale loop situated on a scale so that the scale trace centers are at a constrained spacing along the measuring axis of an induced current position transducer, in operation at various frequencies. The graph shown in FIG. 6 is based on the simulated operation of a representative scale loop in an induced current position transducer, at various operating frequencies. The signal gain plots of FIG. 6 are for a rectangular scale loop similar to that shown in FIG. 7, where the width of all scale trace segments are equal. Using the symbols described below with respect to FIG. 7, the horizontal axis shown in FIG. 6 is the ratio of the scale trace width to the scale loop interior length or $w_x/l_x$. In the simulation performed to obtain the data shown in FIG. 6, while the dimension $C_x$ of the scale loop along the measuring axis was constrained to 1 mm, while the dimension $C_y$ transverse to the measuring axis was constrained to 3 mm. Furthermore, the dimensions $d_f$, $d_c$, and $d_b$ were approximately equal, so that the signal gain shown in FIG. 6 corresponds to approximately a one-third portion of the area of the scale loop overlying a transmitter winding region at one end of the scale loop, approximately a one-third portion of the area of the scale loop overlying a receiver winding region at the other end of the scale loop, and approximately the central one-third of the area of the scale loop acting only as a connecting portion of the loop.

The inventor has determined that for such loops which are generally narrower along the measuring axis than transverse to the measuring axis, the trace width ratio $w_x/l_x$ corresponding approximately to the maximum signal gain is not highly sensitive to the particular overall dimension of a scale loop along the measuring axis. Therefore, the results of FIG. 6 are generally useful for selecting the trace width ratio $w_x/l_x$ of reasonably similar scale loops having a constrained dimension $C_x$ in an inductive position transducer, as described below.

The graph in FIG. 6 illustrates that when other factors affecting the resistance and inductance of a loop trace are held constant, it is very effective to increase the trace width ratio $w_x/l_x$ of scale loops having a constrained dimension $C_x$ up to at least about 0.25 at all operating frequencies shown.

At frequencies above 5 MHz, scale loops having such an increased trace width ratio achieve a signal gain which is at least 80% of the maximum possible signal gain. At frequencies below 5 MHz, larger ratios, such as about 0.45, are desirable to achieve at least 80% of the maximum possible signal gain. Furthermore, a trace width ratio in the range of about 0.4 to about 1.1 improves the signal gain to close to a maximum value at all frequencies from 1 MHz to at least 50 MHz. The graph further illustrates that increasing the trace width ratio over a range greater than about 1.1, up to at least about 2.0, has no significant effect on the signal gain at the 1 MHz operating frequency and a relatively minor negative effect at higher frequencies.

Thus, various exemplary embodiments of the scale loops according to this invention include scale loops having a constrained dimension $C_x$, have trace width ratios $w_x/l_x$ of greater than about 0.25, have trace width ratios of greater than about 0.45, or have trace width ratios of greater than about 0.6. In yet other exemplary embodiments, scale loops according to this invention include scale loops that have trace width ratios of between about 0.4 and about 2.0 or trace width ratios of between about 0.4 and about 1.1.

These trace width ratios are unexpected because the enclosed loop area and the associated inherent inductance are apparently significantly reduced as the trace width ratio increases, and the significance of this reduction with respect to the scale trace resistance in comparison to the inherent inductance has not been appreciated in the field of inductive position transducer design. It should be appreciated that even the smallest of the above ratios is approximately twice as large as the comparable ratio(s) exhibited by known transducers, including the commercial caliper referred to above.

Figure 7:
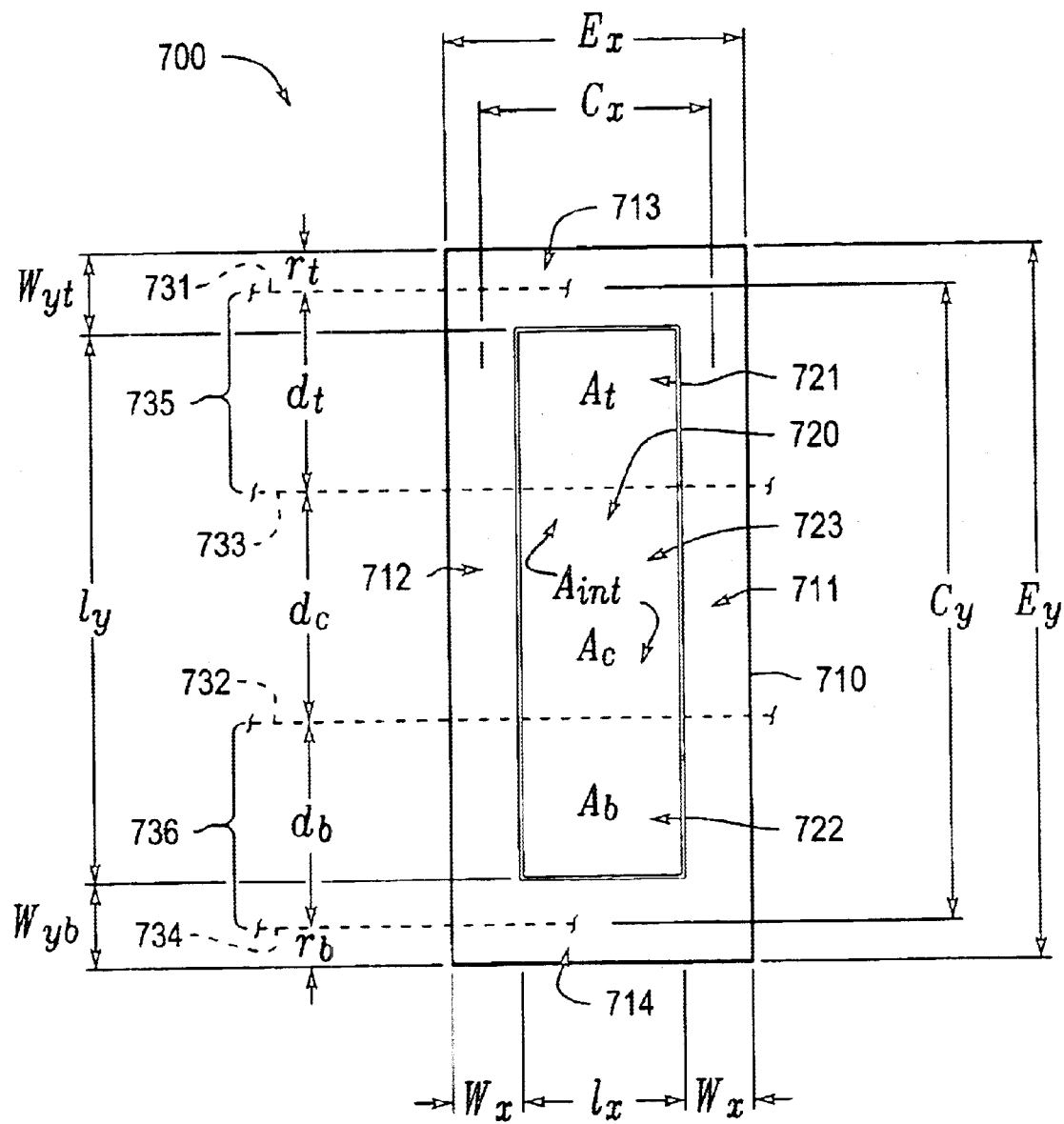
FIG. 7 illustrates a first exemplary embodiment of a scale loop according to this invention.

FIG. 7 illustrates a first exemplary embodiment of a scale loop 700 according to this invention. FIG. 7 and the description below further define the scale loop dimensions associated with the symbols used throughout the application. With regard to the following discussion of FIGS. 7 and 8, it should be appreciated that all scale loop dimensions with an "x" in the subscript denote dimensions parallel to the measuring axis 114 and all scale loop dimensions with a "y" in the subscript denote dimensions transverse to the measuring axis 114.

The scale loop 700 is formed by a scale trace 710 having scale trace segments 711–714, each having a thickness t (not shown). The scale trace segments 711, 712, 713 and 714 have widths $w_x$, $w_x$, $w_{yt}$ and $w_{yb}$, respectively. Making the widths of trace segments 711 and 712 equal generally enhances the accuracy of the associated position transducer. In various exemplary embodiments, the widths of segments 713 and 714 are not equal, and are separately determined as these segments 713 and 714 couple to separate elements on the readhead. In various other exemplary embodiments, the widths of all trace segments are approximately equal.

Region limits 731 and 733 denote the limits of a transmitter and/or receiver region 735 extending parallel to the measuring axis 114, and correspond to the nominal limits of a transmitter and/or receiver region on the readhead of the induced current position transducer. Similarly, region limits 732 and 734 denote the limits of a transmitter and/or receiver region 736 extending parallel to the measuring axis 114, and correspond to the nominal limits of a transmitter and/or receiver region on the readhead of the induced current position transducer. For example, the regions 735 and 736 may correspond to the regions of the first transmitter winding portion 223A and the region of the receiver windings 224 and/or 226 shown in FIG. 2, respectively. In such a case the dimensions $d_t$, $d_b$ and $d_c$ shown in FIG. 7 correspond to the dimensions $d_1$, $d_2$ and $d_3$ shown in FIG. 2, respectively.

The centers of trace segments 713 and 714 are separated by a dimension $C_y$ and their outer edges are separated by a dimension $E_y$. In various exemplary embodiments, the sum of the dimensions $(d_t+d_b+d_c)$ equals and coincides with the dimension $C_y$ and the dimensions $r_t$ and $r_b$ are equal. In various other exemplary embodiments, each of these dimensions are determined independently, according to various readhead and scale alignment considerations which are outside the scope of this invention.

The scale loop 700 has an interior area 720 having interior area coupling portions 721 and 722 and an interior area connecting portion 723. The interior area has overall dimensions $l_x$ and $l_y$, and the total interior area $A_{int}$ of the scale loop 700 is $A_{int}=(l_x*l_y)$. The total interior area $A_{int}$ is composed of the coupling portion 721 overlying the transmitter and/or receiver region 735 and having an area $A_t$, the coupling portion 722 overlying the transmitter and/or receiver region 736 and having an area $A_b$, and the remaining connecting portion 723 having an area $A_c$.

The centers of trace segments 711 and 712 are separated by a dimension $C_x$ and their outer edges are separated by a dimension $E_x$. In various exemplary embodiments, either the dimension $C_x$ or the dimension $E_x$ is constrained according to overall transducer and scale design considerations, and the trace width ratio $w_x/l_x$ is determined according to which dimension is constrained. For example, the exemplary trace width ratios discussed with reference to FIG. 6 relate to a scale loop in which the dimension $C_x$ is constrained. Such constraints and their related ratios are described in greater detail below.

Figure 8:
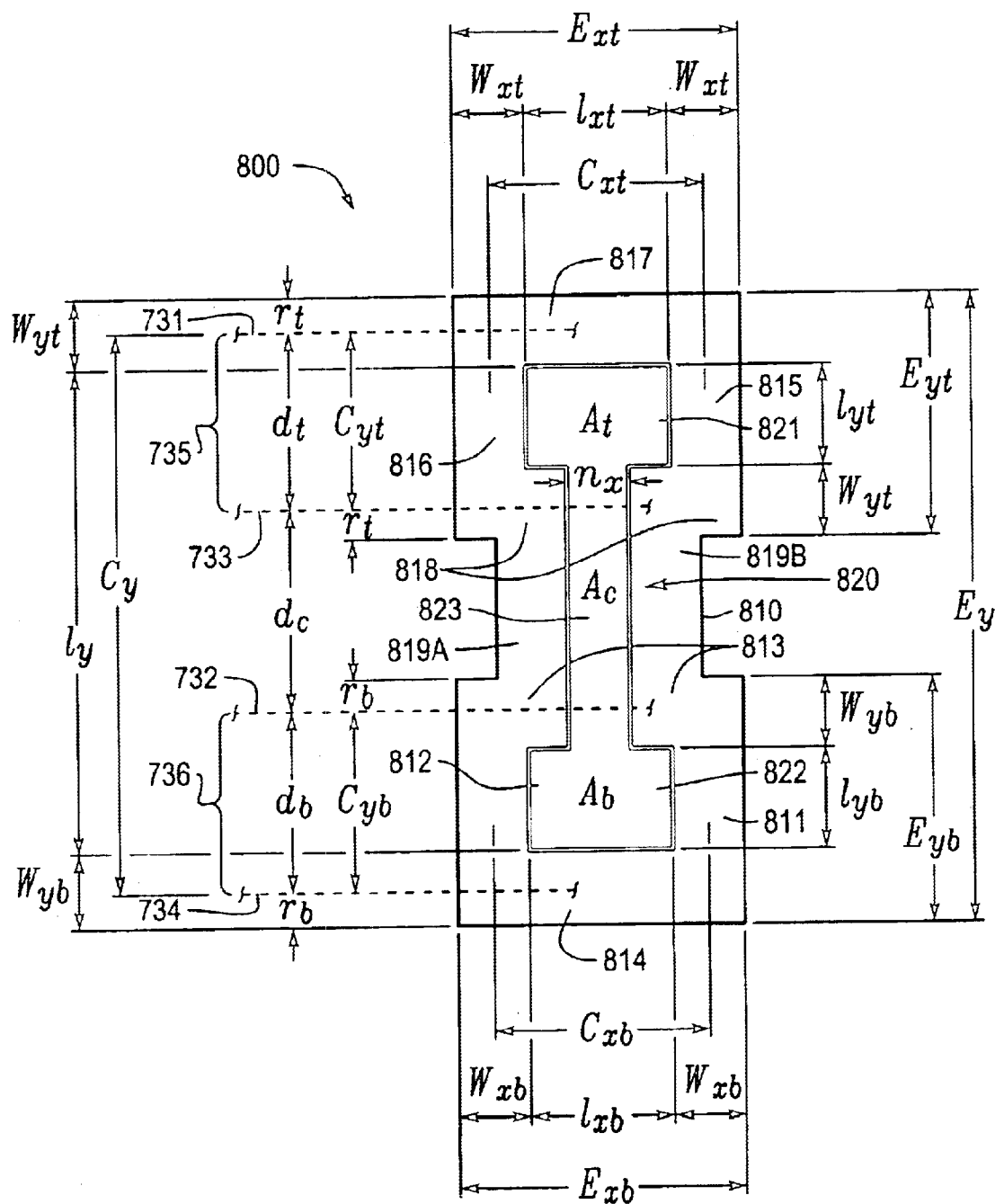
FIG. 8 illustrates a second exemplary embodiment of a scale loop according to this invention.

FIG. 8 illustrates a second exemplary embodiment of a scale loop 800 according to this invention. FIG. 8 and the description below further define the scale loop dimensions associated with the symbols used throughout the application. Reference numerals and symbols which are the same in FIGS. 7 and 8 correspond to similar or identical elements, thus, their description is not repeated with respect to FIG. 8.

The scale loop 800 is formed by a scale trace 810 having scale trace segments 811–819, each having a thickness t (not shown). The scale trace segments 811, 812, 813 and 814 have widths $w_{xb}$, $w_{xb}$, $w_{yb}$ and $w_{yb}$, respectively. Making the widths of trace segments 811 and 812 equal generally enhances the accuracy of the associated position transducer. In various exemplary embodiments, the widths of segments 813 and 814 are also generally made equal since they couple to the same element on the readhead. In various other exemplary embodiments, the widths of all the trace segments 811–814 are made equal.

The scale trace segments 815, 816, 817 and 818 have widths $w_{xt}$, $w_{xt}$, $w_{yt}$ and $w_{yt}$, respectively. In various exemplary embodiments, the widths of trace segments 815 and 816 are approximately equal to enhance the accuracy of a position transducer employing such a scale loop. In various exemplary embodiments, the widths of segments 817 and 818 are also approximately equal as these segments 817 and 818 couple to the same element on the readhead. In various other exemplary embodiments, the widths of all the trace segments 815–818 are made approximately equal.

The scale trace segments 819A and 819B are connection segments of the scale loop 800. In various exemplary embodiments, the segments 819A and 819B are made at least as wide as the widest of the segments 811–818. The segments 819A and 819B can be spaced apart by a dimension $n_x$, which is generally as narrow as may be practically fabricated. When this dimension is relatively narrow, the secondary magnetic field generated by the scale loop 800 is relatively stronger.

The centers of scale trace segments 813 and 814 are separated by a dimension $C_{yb}$ and their outer edges are separated by a dimension $E_{yb}$. In various exemplary embodiments, the dimension $d_b$ equals and coincides with the dimension $C_y$. Similarly, the centers of trace segments 817 and 818 can be separated by a dimension $C_{yt}$ and their outer edges are separated by a dimension $E_{yt}$. In various exemplary embodiments, the dimension $d_t$ equals and coincides with the dimension $C_{yt}$. However, each of these dimensions may alternatively be determined independently, according to various readhead and scale alignment considerations that are outside the scope of this invention.

Similarly to the scale loop 700, the scale loop 800 has an interior area 820 having interior area coupling portions 821 and 822 and an interior area connecting portion 823. The total interior area $A_{int}$ of interior area 820 is composed of the coupling portion 821 overlying the transmitter and/or receiver region 735 and having an area $A_t$, the coupling portion 822 overlying the transmitter and/or receiver region 736 and having an area $A_b$, and the remaining connecting portion 823 having an area $A_c$. The interior area coupling portion 821 has nominal dimensions $l_{xt}$ and $l_{yt}$, and the interior area coupling portion 822 has nominal dimensions $l_{xb}$ and $l_{yb}$. The total interior area of the scale loop 800 is $A_{int}=(A_t+A_b+A_c)$.

The centers of trace segments 811 and 812 are separated by a dimension $C_{xb}$ and their outer edges are separated by a dimension $E_{xb}$. In various exemplary embodiments, either the dimension $C_{xb}$ or the dimension $E_{xb}$ is constrained according to overall transducer and scale design considerations, and the trace width ratio $w_{xb}/l_{xb}$ is determined according to which dimension is constrained. Similarly, the centers of trace segments 815 and 816 are separated by a dimension $C_{xt}$ and their outer edges are separated by a dimension $E_{xt}$. In various exemplary embodiments, either the dimension $C_{xt}$ or the dimension $E_{xt}$ is constrained according to overall transducer and scale design considerations, and the trace width ratio $w_{xt}/l_{xt}$ is determined according to which dimension is constrained. Such constraints and their related ratios are described in greater detail below.

Thus, for the scale loop 800, it should be appreciated that, in general, the interior area coupling portions 821 and 822 and their respective surrounding loop traces can have differing dimensions, differing trace widths, and differing trace width ratios. It should be further appreciated, that in various exemplary embodiments, the regions 735 and 736 correspond to readhead elements and scale tracks having differing scale periods. Thus, the interior area coupling portions 821 and 822 and their respective surrounding loop traces may be offset from one another in a direction parallel to the measuring axis 114, in a manner not shown in FIG. 8, but further illustrated, for example, by the coupling loops 636 shown in FIG. 9.

Regarding the thickness t of the exemplary loops 700 or 800, for relatively planar traces the thickness t is defined as the distance between opposing surfaces of the relatively planar scale traces 710 or 810 in the direction generally parallel to the incident magnetic field of a typical induced current position transducer scale, and, in various exemplary embodiments, is determined as previously described in the discussion with respect to FIG. 5.

Relatively planar scale traces can be formed on a suitable substrate using conventional circuit board manufacturing technology, conventional thin-film circuit manufacturing technology, or other suitable manufacturing processes. The substrate can be a material that has a lower electrical conductivity than the material that forms the loop traces 710 or 810, or it can be an insulator. The substrate can have mechanical properties that are suitably usable with the configuration of the reduced-offset-type induced current position transducer in which the scale loop 700 or 800 is employed.

In various other exemplary embodiments of the scale loops according to this invention, the cross-sectional area of the scale trace can be a circle or an ellipse, such as when the scale loop is formed from wire. In such cases, the scale trace will still be characterized and/or constrained by the various C and/or E dimensions previously discussed. Thus, the dimensions of the interior area can be initially approximated. Using a ratio selected based on the systems and methods according to this invention, the approximate dimensions of the interior area will indicate a corresponding trace width. To size a non-planar scale trace having a cross-section that is relatively thick compared to its width according to the principles of this invention, the perimeter of the cross-section of the non-planar scale trace should be made equal to two times the trace width indicated by the ratio selected according to this invention. Having initially selected a non-planar scale trace shape and perimeter, the interior area can be more closely approximated, and the non-planar scale trace shape and perimeter further refined according to the selected ratio.

It should be appreciated that the scale loop 700 or 800 can be formed in any shape dictated by the configuration of the reduced-offset-type induced current position transducer in which the scale loop 700 or 800 is employed. The scale loops of FIGS. 7 and 8 illustrate two of the many shapes that the scale loops according to this invention can take to be usable in various reduced-offset-type induced current position transducers.

As previously stated, in various exemplary embodiments, the appropriate dimension(s) among the dimensions $C_x$, $E_x$, $C_{xb}$, $E_{xb}$, $C_{xt}$ and $E_{xt}$ are constrained according to overall transducer and scale design considerations, and the corresponding trace width ratios among $w_x/l_x$, $w_{xb}/l_{xb}$, and $w_{xt}/l_{xt}$ are determined according to which dimensions are constrained.

FIG. 9 is a known reduced-offset-type induced current absolute position transducer corresponding to FIG. 8 of the incorporated '497 application and is described therein. It should be appreciated that the receiver windings 614, 616 and 618 of FIG. 9 are periodic and exhibit respective spatial periods or wavelengths. The dimensions of the scale loop portions overlying these various receiver windings must correspond to their respective spatial periods. In particular, the spatial period of the secondary magnetic fields generated by scale loop portions which are aligned along the measuring axis should ideally have precisely the same spatial period as the spatial period of any winding that it overlies.

It should be noted that, in FIG. 9, along scale tracks overlying the receiver windings 614, 616 and 618 and corresponding to the dimensions $d_{24}$, $d_{26}$ and $d_{28}$, respectively, the scale loop portions 634, 628 and 640 are not closely spaced along the measuring axis. The periodic secondary magnetic field generated by the scale loop portions 634, 628 and 640 will change polarity precisely at the midpoint of each scale trace segment which is aligned transverse to the measuring axis 114. It is desirable that the secondary magnetic field change polarity spatially periodically at a precise spacing of $\lambda/2$, to match the underlying periodic receiver windings at a desired spatial period or wavelength. Accordingly, for such a scale track, it is desirable that each scale loop portion be constrained to have a scale trace center to center spacing along the measuring axis that is $\lambda/2$. More generally, for such scale tracks the applicable dimension $C_x$, $C_{xt}$, and/or $C_{xb}$ is constrained to be $\lambda/2$, to match the underlying periodic receiver windings at a desired spatial period or wavelength.

Figure 10:
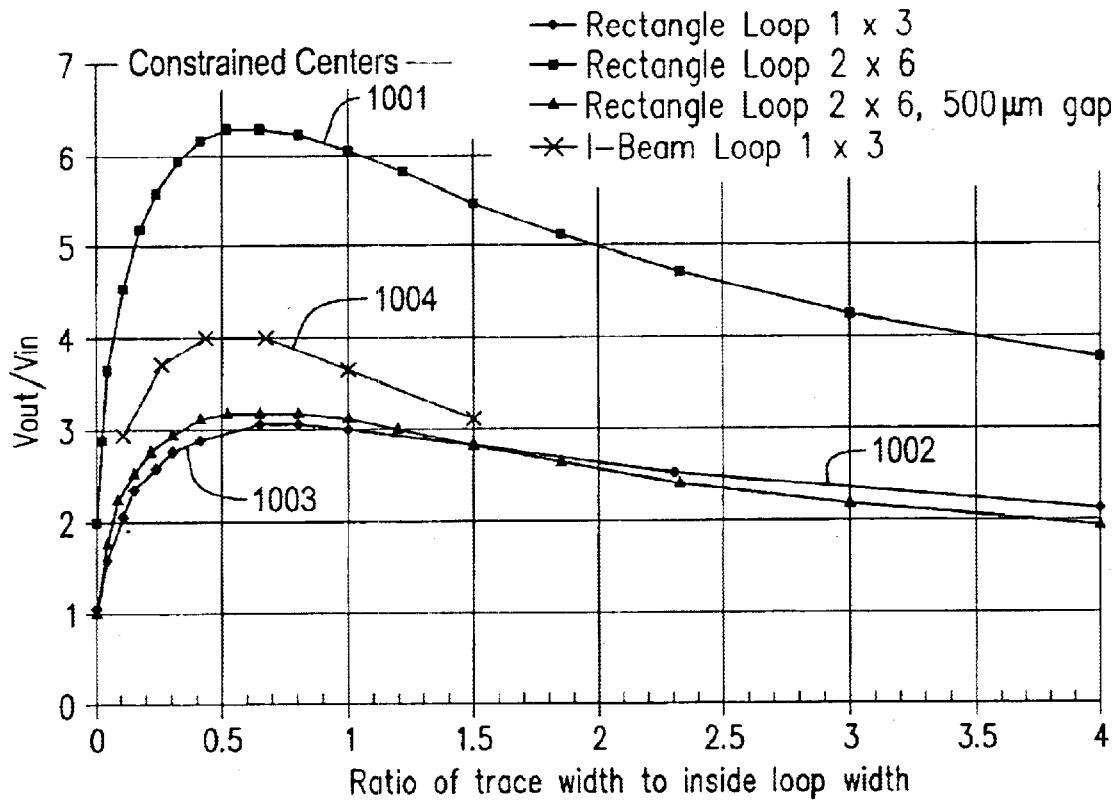
FIG. 10 is a graph showing signal gain as a function of the ratio of trace width to interior length of a scale loop situated on a scale so that the scale traces are at a constrained spacing along the measuring axis, for various scale loops in an induced current position transducer operating at 10 MHz.

The exemplary trace width ratios for a set of cases in which the dimension $C_x$ is constrained have been previously discussed with respect to FIG. 6. FIG. 10 also shows results obtained for a set of cases in which the dimension $C_x$ is constrained.

FIG. 10 is a graph showing the signal gain as a function of the ratio of the trace width to the interior length of a scale loop situated on a scale so that the scale traces are at constrained spacing along the measuring axis, for various scale loops in an induced current position transducer operating at 10 MHz. Using symbols described with respect to FIG. 7, the horizontal axis shown in FIG. 10 is the trace width ratio $w_x/l_x$. The results displayed in plots 1001 and 1002 are for an exemplary rectangular scale loop, such as that shown in FIG. 7, with the dimension $C_x$ of the scale loop along the measuring axis constrained at 2.0 mm and the dimension $C_y$ transverse to the measuring axis constrained at 6.0 mm. For the results of the plot 1002, the gap between the readhead and the scale of the induced current position transducer has been doubled relative to the gap used for all other results. Thus, the maximum signal gain shown by the plot 1002 is greatly reduced compared to the results of the plot 1001.

The results displayed in the plot 1003 are for an exemplary rectangular scale loop such as that shown in FIG. 7, with the dimension $C_x$ of the scale loop along the measuring axis constrained at 1.0 mm and the dimension $C_y$ transverse to the measuring axis constrained at 3.0 mm.

The results of the plot 1004 are for an exemplary "I-shaped" scale loop, such as that shown in FIG. 8, with the dimensions $C_{xt}$ and $C_{xb}$ of the scale loop along the measuring axis constrained at 1.0 mm and the dimension $C_y$ transverse to the measuring axis constrained at 3.0 mm. It should be appreciated that the narrower central portion of a generally I-shaped scale loop is not intended to provide an inductive coupling area in the operation of an induced current position transducer, as it is not intentionally coupled to either a transmitter or receiver loop, as shown in FIG. 2. Therefore, the dimensions of the central portion are not considered in detail, and the trace width ratio shown along the x-axis for the results of the plot 1004 are for the relatively wider end portions of the I-shaped scale loop, that is, for $w_{xb}/l_{xb}$ and $w_{xt}/l_{xt}$, which are equal in this case and therefore need not be distinguished from $w_x/l_x$ in the following discussion of FIG. 10.

For each of the plots 1001–1004, the dimensions $d_t$, $d_c$, and $d_b$ are made approximately equal, that is, the signal gain shown in FIG. 10 corresponds to approximately a one third portion of the area of the scale loop overlying a transmitter winding region at one end of the scale loop, approximately a one third portion of the area of the scale loop overlying a receiver winding region at the other end of the scale loop, and approximately the central one third of the area of the scale loop acting only as a connecting portion of the loop.

The inventor has discovered that, in such loops that are generally narrower along the measuring axis than transverse to the measuring axis, the scale trace width ratio corresponding approximately to the maximum signal gain is not highly sensitive to the particular overall dimension of a scale loop along the measuring axis. Therefore, the results of FIG. 10 are generally useful for selecting the loop trace width ratio $w_x/l_x$ of reasonably similar scale loops having a constrained dimension $C_x$ in an induced current position transducer, as described below.

It should be appreciated that the plots 1001–1004 indicate maximum signal gain at very similar values of the trace width ratio $w_x/l_x$, despite the varied simulation conditions. The graph in FIG. 10 illustrates that when other factors affecting the resistance and inductance of a scale loop are held constant, it is very effective to increase the trace width ratio $w_x/l_x$ of scale loops having a constrained dimension $C_x$ up to at least about 0.2. At a 10 MHz operating frequency, this achieves a signal gain which is approximately 80–90% of the maximum possible signal gain. Furthermore, a trace width ratio between about 0.4 and about 1.1 improves the signal gain to close to a maximum value. The graph further illustrates that increasing the trace width ratio over a range of from greater than about 1.1, up to at least about 2.0, does not diminish the signal to less than 80% of the maximum value.

Thus, various exemplary embodiments of the scale loops according to this invention include scale loops having a constrained dimension $C_x$ having a trace width ratio $w_x/l_x$ of greater than about 0.2. Various other exemplary embodiments include scale loops having a constrained dimension $C_x$ having a trace width ratio of greater than about 0.4. In yet other exemplary embodiments, the scale loops of this invention include scale loops having a constrained dimension $C_x$ having a trace width ratio of between about 0.4 and about 2.0. Still further exemplary embodiments include scale traces having a constrained dimension $C_x$ having a trace width ratio of between about 0.4 and about 1.1.

These trace width ratios are unexpected because the enclosed loop area and the associated inherent inductance are apparently significantly reduced as the trace width ratio increases, and the significance to the loop trace resistance in comparison to the inherent inductance has not been appreciated in the field of inductive position transducer design. It should be appreciated that even the smallest of the above ratios is approximately 50% greater than the comparable ratio exhibited by the prior art transducer of the commercial caliper referred to above.

FIG. 10 indicates very nearly the same relationships between trace width ratio and signal gain as previously discussed with respect to FIG. 6 for rectangular scale loops. However, in the case of the I-shaped scale loop with similar top and bottom portions corresponding to the plot 1004, it appears that effective and optimum trace width ratios are reduced approximately 25–30% compared to the favorable ratios discovered with respect to rectangular scale loops.

Accordingly, various exemplary embodiments of the scale loops according to this invention include I-shaped scale loops having constrained dimensions $C_{xb}$ or $C_{xt}$, having trace width ratios for either their top or bottom portions of greater than about 0.2. Various other exemplary embodiments include I-shaped scale loops having constrained dimensions $C_{xb}$ or $C_{xt}$, having trace width ratios for either their top or bottom portions of greater than about 0.3. In yet other exemplary embodiments, I-shaped scale loops having constrained dimensions $C_{xb}$ or $C_{xt}$, having trace width ratios of between about 0.3 and about 1.1 are included. Still further exemplary embodiments include I-shaped scale loops having constrained dimensions $C_{xb}$ or $C_{xt}$, having trace width ratios of between about 0.3 and about 0.8.

In various exemplary embodiments of the scale loops according to this invention, one of the applicable dimensions $E_x$, $E_{xt}$, or $E_{xb}$ is constrained. This type of constraint is explained with respect to FIG. 2. Similarly to the previous constraint discussion, it should be appreciated that the receiver windings 224 and 226 of FIG. 2 are periodic and exhibit respective spatial periods or wavelengths. The dimensions of the scale loop portions overlying these various receiver windings must correspond to their respective spatial periods. In particular, the spatial period of the secondary magnetic fields generated by scale loop portions which are aligned along the measuring axis should ideally have precisely the same spatial period as the spatial period of any winding that it overlies.

It should be noted that in FIG. 2, along a scale track overlying the receiver windings and corresponding to the dimension $d_2$, in contrast with the previous constraint discussion with respect to FIG. 9, the scale loop portions 214 and 218 are closely spaced and the current flows in the same direction in the adjacent closely spaced conductors. Accordingly, the periodic secondary magnetic field generated by the scale loop portions 214 and 218 will change polarity precisely at the midpoint between the closely spaced conductors of the adjacent loop portions 214 and 218. It is desirable that this field change polarity spatially periodically at a precise spacing of $\lambda/2$, to match the underlying periodic receiver windings at a desired spatial period or wavelength. Accordingly, for such a scale track, each scale loop portion 214 or 218 should be constrained to have an outer dimension along the measuring axis that is not greater than $\lambda/2$. More generally, for such scale tracks the applicable dimension $E_x$, $E_{xt}$, or $E_{xb}$ is constrained to be less than $\lambda/2$, to match the underlying periodic receiver windings at a desired spatial period or wavelength. The constraint can additionally be chosen so that adjacent scale loops can be fabricated with an insulating space between them.

As shown in FIG. 2, the scale loop portions 212 are also closely spaced, along a scale track overlying the transmitter winding region 223A and corresponding to the dimension $d_1$. Since there is no underlying winding having a periodic structure, the loop portions 212 are closely spaced simply so that they are as large as possible, in order to couple to the transmitter winding as strongly as possible. It is generally beneficial to have each loop portion of identical size, therefore for such scale tracks the applicable outer dimension $E_x$, $E_{xt}$, or $E_{xb}$ is constrained to be less than $\lambda$. The constraint can additionally be chosen such that adjacent conductors can be fabricated with an insulating space between them.

Figure 11:
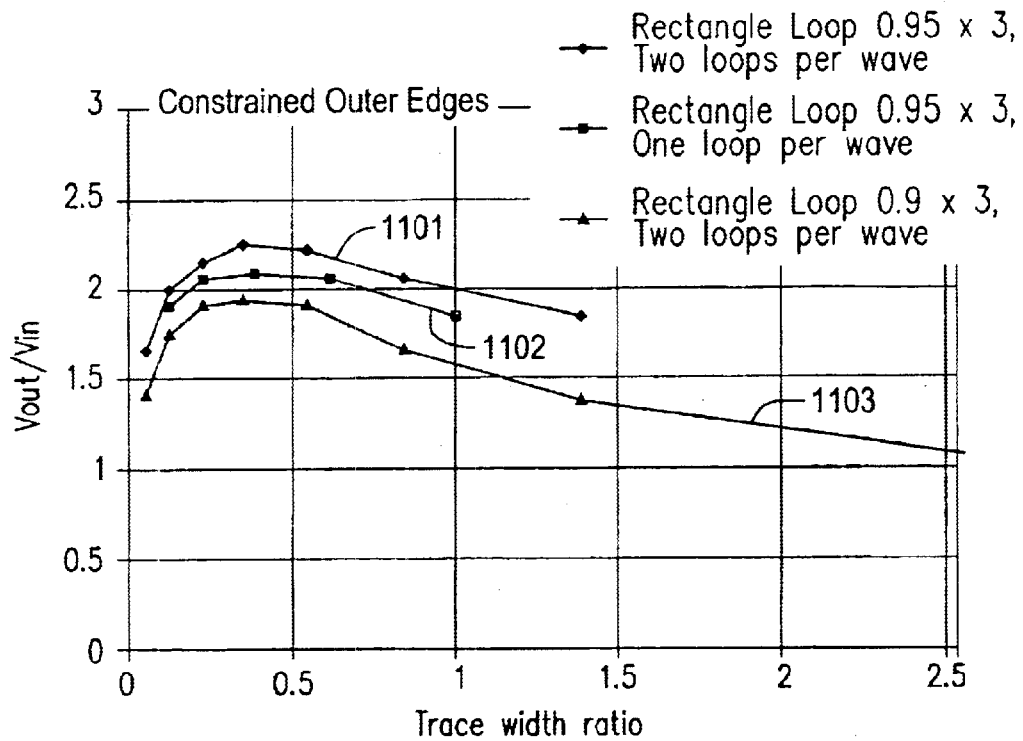
FIG. 11 is a graph showing signal gain as a function of the ratio of trace width to the interior length of a rectangular scale loop situated on a scale so that the overall loop size is constrained, for various size and scale configurations in an induced current position transducer operating at 10 MHz.

FIG. 11 is a graph showing the signal gain as a function of the scale trace width ratio of a rectangular scale loop when the overall loop size $E_x$ is constrained along the measuring axis and the dimension $E_y$ is constrained along the direction transverse to the measuring axis, for minor size and scale configuration variations according to simulated operation in an induced current position transducer operating at 10 MHz.

The signal gain plots of FIG. 11 are for a rectangular scale loop similar to that shown in FIG. 7, where the width of all scale trace segments are equal. Using symbols described with respect to FIG. 7, the horizontal axis shown in FIG. 11 is the trace width ratio $w_x/l_x$. The dimension $E_x$ of the scale loop along the measuring axis is constrained at 0.95 mm for the results illustrated by the plots 1101 and 1103 and at 0.90 mm for the results illustrated by the plot 1102. Furthermore, for the results shown in the plots 1101 and 1102, the scale loop was simulated in an environment of closely spaced adjacent loops. For the results shown in the plot 1103, the scale loop was simulated in isolation.

For each of the plots 1101–1103, the dimension $E_y$ transverse to the measuring axis is constrained at 3 mm.

Furthermore, the dimensions $d_t$, $d_c$, and $d_b$ are made approximately equal, that is, the signal gain shown in FIG. 11 corresponds to approximately a one third portion of the area of the scale loop overlying a transmitter winding region at one end of the scale loop, approximately a one third portion of the area of the scale loop overlying a receiver winding region at the other end of the scale loop, and approximately the central one third of the area of the scale loop acting only as a connecting portion of the loop.

The inventor has discovered that in such loops that are generally narrower along the measuring axis than transverse to the measuring axis, the scale trace width ratio $w_x/l_x$ corresponding approximately to the maximum signal gain is not highly sensitive to the particular overall dimension of a scale loop along the measuring axis. Therefore, the results of FIG. 11 are generally useful for selecting the scale trace width ratio $w_x/l_x$ of reasonably similar scale loops having a constrained dimension $E_x$ in an inductive position transducer, as described below.

It should be appreciated that the plots 1101–1103 indicate maximum signal gain at very similar values of the scale trace width ration $w_x/l_x$, despite the varied simulation conditions. The graph in FIG. 11 illustrates that when other factors affecting the resistance and inductance of a loop trace are held constant, it is very effective to increase the trace width ratio $w_x/l_x$ of scale loops having a constrained dimension $E_x$ up to at least about 0.2. At a 10 MHz operating frequency, this achieves a signal gain which is approximately 95% of the maximum possible signal gain. Furthermore, a trace width ratio of from about 0.25 to about 0.6 improves the signal gain to close to a maximum value. The graph further illustrates that increasing the trace width ratio over a range of greater than about 0.6, up to at least about 0.9, does not diminish the signal to less than 80% of the maximum value.

Thus, various exemplary embodiments of this invention include scale loops having a constrained dimension $E_x$ having trace width ratios of greater than about 0.2. Various other exemplary embodiments include scale loops with a constrained dimension $E_x$ having trace width ratios of greater than about 0.25. Yet other exemplary embodiments include scale loops with a constrained dimension $E_x$ having trace width ratios of between about 0.25 and about 0.9. Still further exemplary embodiments include scale loops with a constrained dimension $E_x$ having trace width ratios of between about 0.25 and about 0.6.

These trace width ratios are unexpected since the enclosed loop area and the associated inherent inductance are apparently significantly reduced as the trace width ratio increases, and the significance to the scale trace resistance in comparison to the inherent inductance has not been appreciated in the field of inductive position transducer design. It should be appreciated that even the smallest of the above ratios is at least 50% greater than comparable ratios exhibited by the prior art transducers, such as the commercial caliper referred to above.

All of the previously discussed exemplary trace width ratios were determined for scale loop configurations where the dimensions $d_t$, $d_c$, and $d_b$ were made approximately equal, that is, with approximately a one third portion of the area of the scale loop overlying a transmitter winding region at one end of the scale loop, approximately a one third portion of the area of the scale loop overlying a receiver winding region at the other end of the scale loop, and approximately the central one third of the area of the scale loop acting only as a connecting portion of the loop. For scale loop configurations where the dimension $d_c$ is made relatively smaller or larger relative to the dimensions $d_t$ and $d_b$, it is appropriate to adjust the previously discussed exemplary trace width ratios according to the following explanation with respect to FIG. 12.

Figure 12:
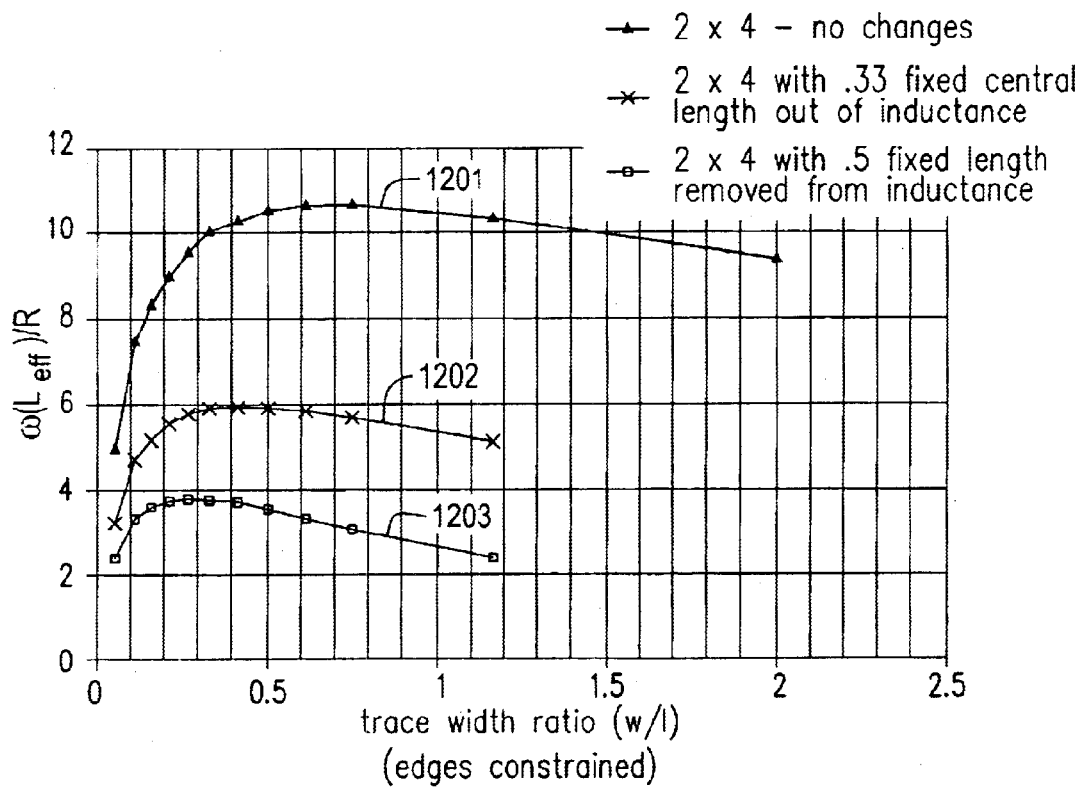
FIG. 12 is a graph showing a quantity related to the signal provided by rectangular loops having various effective coupling areas as a function of the ratio of trace width to the interior length of the loop situated on a scale so that the overall loop size is constrained.

FIG. 12 is a graph showing a quantity related to the signal provided by a rectangular loop as a function of the scale trace width ratio of the loop when the overall loop size is constrained, for variations in the effective coupling area of the loop. The plots of FIG. 12 are for a rectangular scale loop similar to the scale loop shown in FIG. 7, where the width of all scale trace segments are equal. The quantity related to the signal that is plotted along the y-axis is proportional to an operating frequency $\omega$ of the induced current position transducer including the scale loop times the effective inductance $L_{eff}$ of the scale loop divided by the inherent resistance R of the scale loop. The effective inductance $L_{eff}$ is the inherent inductance of the scale loop reduced according to the proportion of the loop which is assumed not to overlay or couple to either a transmitter or receiver region. That is, the inherent inductance is reduced by an amount corresponding to the proportional area of the loop corresponding to the dimension $d_c$.

Using symbols defined with respect to FIG. 7, the horizontal axis shown in FIG. 11 is the trace width ratio $w_x/l_x$. For each of the plots 1201–1203, the dimension $E_x$ along the measuring axis is constrained at 2 mm and the dimension $E_y$ transverse to the measuring axis constrained at 4 mm.

The results of the plot 1201 correspond to a case where $d_c$ is zero, corresponding to a transmitter coupling region and a receiver coupling region which are immediately adjacent to one another. Thus, for the results of the plot 1201, $L_{eff}$ equals the total inherent inductance of the loop. The results of the plot 1202 correspond to a case where, the dimensions $d_t$, $d_c$, and $d_b$ are made equal. Thus, the results of the plot 1202, correspond to a configuration similar to that underlying the results of FIG. 11. It should be appreciated that the trace width ratios corresponding to the peak signal gains in the plots of FIG. 11 are very similar to the trace width ratio corresponding to the peak of the plot 1202.

The results of the plot 1203 correspond to a case where the dimensions $d_t$, and $d_b$ are one half of the dimension $d_c$, that is, the results correspond to a case with approximately a one quarter portion of the area of the scale loop overlying a transmitter winding region at one end of the scale loop, approximately a one quarter portion of the area of the scale loop overlying a receiver winding region at the other end of the scale loop, and approximately the central one half of the area of the scale loop acting only as a connecting portion of the loop. The plots 1201, 1202 and 1203 show maximum values at trace width ratio values of about 0.65, about 0.4 and about 0.28, respectively.

Thus, in various exemplary embodiments of the scale loops according to this invention, as the dimension $d_c$ of the connecting portion of a scale loop becomes smaller relative to the dimensions $d_t$ and $d_b$ of the coupling portions of the scale loop, the previously stated exemplary trace width ratios are advantageously increased by up to 65% of their stated values. In various other exemplary embodiments, as the dimension $d_c$ of the connecting portion of a scale loop becomes larger relative to the dimensions $d_t$ and $d_b$ of the coupling portions of the scale loop, the previously stated exemplary trace width ratios are advantageously decreased by as much as 30% of their stated values.

All of the previously discussed exemplary trace width ratios were determined for scale loop configurations where the widths of all scale trace segments were made equal. However, it is often advantageous to use scale loop configurations where various widths are used for various scale trace segments. In such cases, it is appropriate to adjust or augment the previously discussed exemplary trace width ratios according to the following explanation with respect to FIGS. 13–15.

Figure 13:
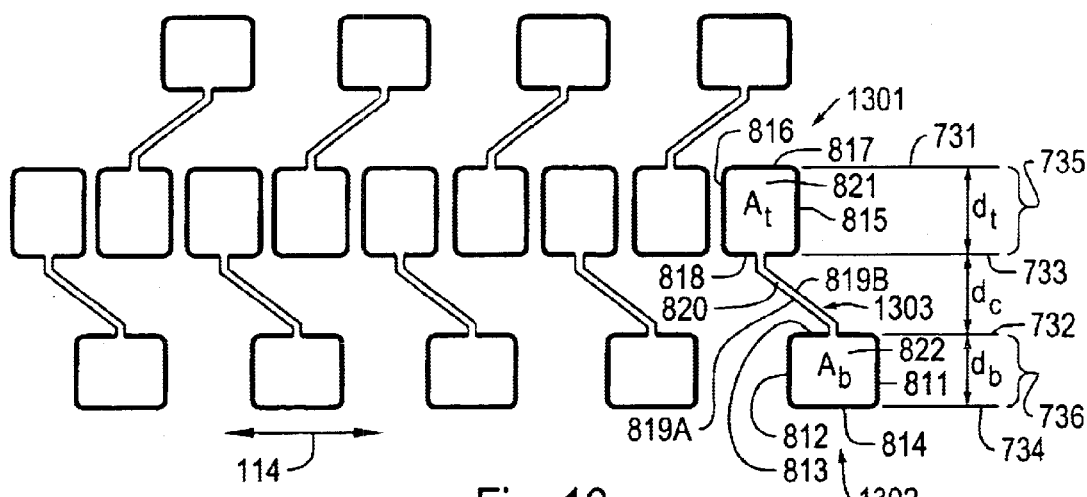
FIG. 13 is a drawing of the scale loops of a known reduced-offset-type induced current absolute position transducer.

FIG. 13 is a drawing that closely approximates the scale loop configuration of a portion of the scale of the known transducer used in the commercial caliper referred to above. For one representative scale loop 1300, various elements have been labeled as they correspond to the discussion of FIG. 8, above. The following discussion indicates some exemplary ways of enhancing the scale loop 1300 according to this invention.

For purposes of this discussion, a scale loop coupling portion 1301 includes the coupling portion 821 and its surrounding trace segments 815–818. Similarly, a scale loop coupling portion 1302 includes the coupling portion 822 and its surrounding trace segments 811–814. A scale loop connection portion 1303 includes the connecting portion 820 and its surrounding trace segments 819A and 819B. When various trace widths are used for various trace segments, separately enhancing the portions of any scale loop that correspond to the portions 1301–1303 of the scale loop 1300 will tend to enhance the overall signal coupling efficiency of that scale loop. Accordingly, the scale loop coupling portions 1301 and 1302 may be advantageously optimized as separate loops in various exemplary embodiments according to this invention. The optimization of separate loops is discussed with respect to FIG. 14.

Figure 14:
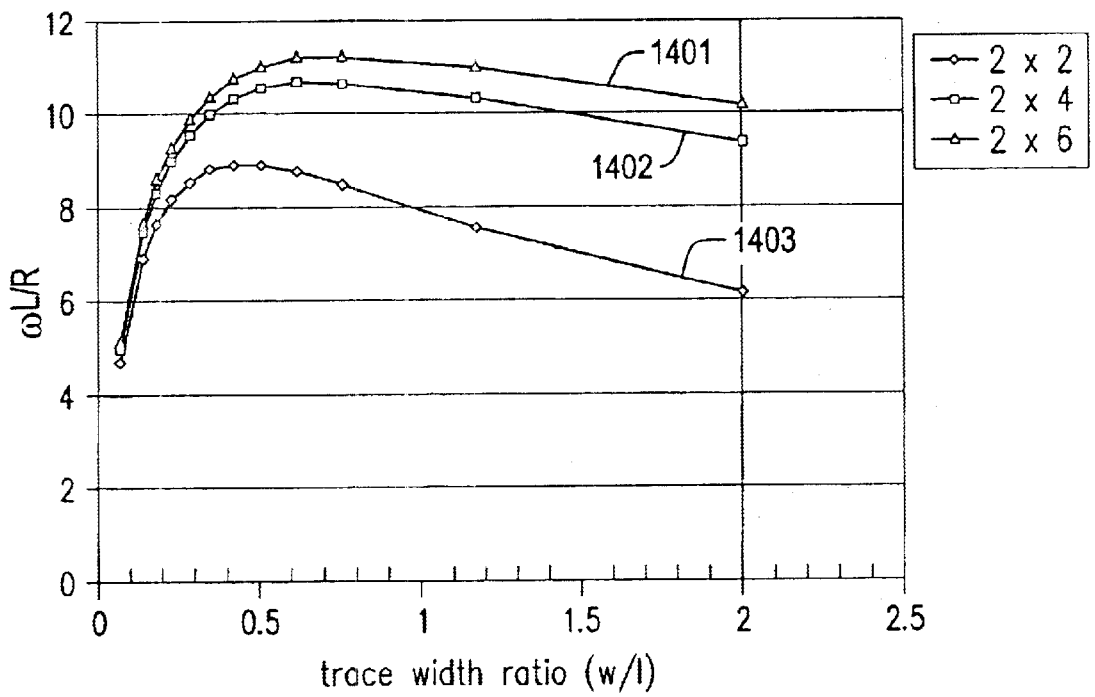
FIG. 14 is a graph showing a quantity related to the signal provided by various rectangular loops as a function of the ratio of trace width to interior length of the loop situated on a scale so that the overall loop size is constrained.

FIG. 14 is a graph showing a quantity related to the signal provided by various rectangular loops as a function of the trace width ratio of the loop when the overall loop size is constrained. The plots of FIG. 14 are for rectangular loop where the widths of all loop trace segments are equal. The quantity related to the signal which is plotted along the y-axis is proportional to the operating frequency $\omega$ of the induced current position transducer times the inherent inductance L of the scale loop divided by the inherent resistance R of the scale loop.

The horizontal axis shown in FIG. 14 is the scale trace width ratio the trace width w to the narrower interior dimension of the loop $l_{narrow}$, (i.e. $w/l_{narrow}$). For each of the plots 1401–1403, the narrow overall dimension $E_{narrow}$ is constrained to 2 mm.

The results of the plot 1401 correspond to a case where the longer overall dimension of a scale loop coupling portion $E_{long}$ is constrained to 6 mm. The results of the plot 1402 correspond to a case where the longer overall dimension $E_{long}$ is constrained to 4 mm. Thus, the results of the plot 1402, are the same as the results of the plot 1201 of FIG. 12. The results of the plot 1403 correspond to a case where the longer overall dimension $E_{long}$ is constrained to 2 mm. The inventor has determined that for a set of loops having approximately the same $E_{long}/E_{narrow}$ ratio, the loop trace width ratio $w/l_{narrow}$ corresponding approximately to the maximum signal gain is not highly sensitive to the particular overall dimensions of a scale loop. Therefore, the results of FIG. 14 are generally useful for selecting the scale trace width ratio $w/l_{narrow}$ of similar coupling portion loops having a constrained dimension $E_{long}$ and/or $E_{narrow}$ in an induced current position transducer, as described below.

The graph in FIG. 14 illustrates that when other factors affecting the resistance and inductance of a loop trace are held constant, it is very effective to increase the trace width ratio $w/l_{narrow}$ of scale loops having a constrained dimension $E_{narrow}$ up to at least about 0.2 for all configurations shown. At a 10 MHz operating frequency, this corresponds to a signal coupling capability which is 80–90% of the maximum possible signal coupling capability. For relatively square configurations, this achieves a signal coupling capability that is approximately 90% of the maximum possible signal coupling capability. For more elongated configurations, larger ratios such as about 0.3, are required to achieve at least 90% of the maximum possible signal coupling capability.

Furthermore, trace width ratios in the range of from about 0.3 to about 0.7 improve the signal coupling capability to close to a maximum value for relatively square configurations and trace width ratios in the range of from about 0.3 to about 1.5 improve the signal coupling capability to close to a maximum value for more elongated configurations. The graph further illustrates that, for more elongated configurations, increasing the trace width ratios over a range of from greater than about 1.5, up to at least about 2.0, does not diminish the signal coupling capability to less than 80% of the maximum value.

Thus, various exemplary embodiments of the scale loops according to this invention include scale loops with a constrained dimension $E_{narrow}$ having trace width ratios $w/l_{narrow}$ of greater than about 0.2. Various other exemplary embodiments include scale loops with a constrained dimension $E_{narrow}$ having trace width ratios of greater than about 0.3. Yet other exemplary embodiments include scale loops with a constrained dimension $E_{narrow}$ having trace width ratios of between about 0.3 and about 2.0. Further exemplary embodiments include scale loops with a constrained dimension $E_{narrow}$ having trace width ratios between about 0.3 and about 1.5 and scale loops with a constrained dimension $E_{narrow}$ having trace width ratios of between about 0.3 and about 0.7.

These trace width ratios are unexpected since the enclosed loop area and the associated inherent inductance are apparently significantly reduced as the trace width ratio increases, and the significance to the scale loop resistance in comparison to the inherent inductance has not been appreciated in the field of inductive position transducer design. It should be appreciated that even the smallest of the above ratios is at least 50% greater than the comparable ratio exhibited by the known transducer of the commercial caliper referred to above.

It should further be appreciated that the plots 1401, 1402 and 1403 show maximum values at trace width ratio values of approximately 0.75, 0.6, and 0.4, respectively. Thus, according to the results shown in FIG. 14, relatively more square loops should have relatively lower trace width ratios and more elongated loops should have relatively higher trace width ratios. Thus, in various exemplary embodiments according to this invention, the widths of the scale traces of scale loop coupling portions similar to the scale loop coupling portions 1301 and 1302 need not be equal. Rather, depending on the various other design constraints influencing the shape of each respective scale loop coupling portion, the trace width ratio for a scale loop coupling portion is chosen according to the exemplary trace width ratios and associated discussion above with respect to FIG. 14.

It should also be appreciated that the widths of the various scale trace segments need not be equal within a scale loop coupling portion, or that a particular trace segment have a uniform width. In general, to increase the signal coupling capability of a loop, it is very useful to reduce the scale loop resistance R relative to the quantity involving loop inductance ($\omega L$). As previously discussed, when any dimension spanned by a scale loop is constrained according to various transducer design considerations, the interior area and the associated inherent inductance of a scale loop will decrease as the width of the loop trace increases to decrease the resistance of the scale loop.

In such cases, the previously discussed exemplary trace width ratios are advantageously applied. However, if a step can be taken to reduce the scale loop resistance R without affecting the quantity involving loop inductance ($\omega L$), that step is generally beneficial regardless of trace width ratios otherwise determined. Thus, to the extent that any loop trace segment of loop can increase in width, to decrease its resistance without requiring a corresponding decrease in an interior coupling area dimension of the loop, that increased width is beneficial.

In general, any scale loop trace segment or portion of a trace loop segment may increase in width outside the limits of any magnetic field generating region and any magnetic field sensing region without affecting the coupling area of that scale loop, so long as the accuracy of the expected spatially-periodic signal from the transducer is not adversely affected. For example, in the absence of constraints on the dimensions $E_y$, $E_{yb}$ or $E_{yt}$, the portions of the trace segments 817 and 818 which lie outside the limits 731 and 733 of the transmitter and/or receiver region 735, and the portions of the trace segments 813 and 814 which lie outside the limits 732 and 734 of the transmitter and/or receiver region 736, may be increased in width beyond the exemplary trace width ratios previously discussed.

Increasing the loop trace widths of the trace segments 819A and 819B of the connecting portion 1303 is particularly beneficial because they comprise a significant portion of the total scale loop length in many practical applications and, thus, contribute significantly to the overall scale loop resistance R. Because the width of the trace segments 819A and 819B generally has no effect on the interior area of the scale loop coupling portions, their width is generally limited only by other fabrication or design considerations. Related considerations are discussed with respect to FIG. 15.

Figure 15:
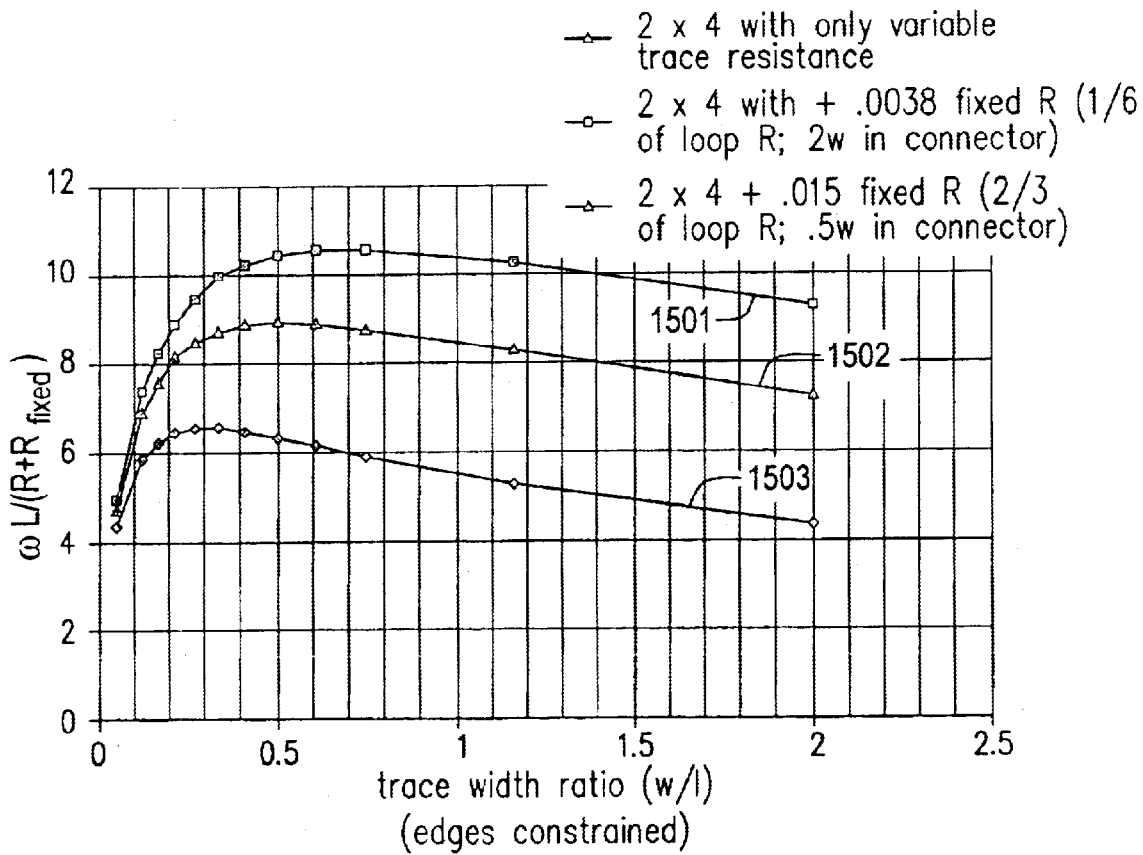
FIG. 15 is a graph showing a quantity related to the signal provided by a rectangular loops in series with various fixed resistances as a function of the ratio of trace width to the interior length of the loop situated on a scale so that the overall loop size is constrained.

FIG. 15 is a graph showing a quantity related to the signal provided by a rectangular loop as a function of the trace width ratio of the loop when the overall loop size is constrained, for variations in a fixed resistance in series with the loop. The plots of FIG. 15 are for a rectangular loop, where the widths of all scale trace segments are equal. The quantity related to the signal which is plotted along the y-axis is proportional to the operating frequency $\omega$ times the inherent inductance L of the scale loop divided by the scale loop resistance R summed with a fixed resistance $R_{fixed}$.

In particular, for purposes of this discussion, the resistance of the trace segments 819A and 819B is regarded as the fixed resistance $R_{fixed}$, which is external to a scale loop, which corresponds to a scale coupling loop portion and has a resistance R. The horizontal axis shown in FIG. 15 is the scale trace width ratio of the trace width w to the narrower interior dimension of the loop $l_{narrow}$ (i.e., $w/l_{narrow}$). For each of the plots 1501–1503, the narrow overall dimension $E_{narrow}$ of the loop is constrained to 2 mm and the longer overall dimension of $E_{long}$ is constrained to 4 mm.

The results of the plot 1501 correspond to the fixed resistance $R_{fixed}$ being zero. Thus, the results of the plot 1501 are the same as the results of the plot 1402 of FIG. 14. The results of the plot 1502 correspond the fixed resistance $R_{fixed}$ being set to approximately $\frac{1}{6}$ of the resistance of the loop configuration corresponding to the peak result of the plot 1501. For a scale loop of the approximate configuration of the loop 1300 shown in FIG. 13, this corresponds to a connecting portion trace segment width that is roughly half of the coupling portion trace segment width at the peak result of the plot 1501. The results of the plot 1503 correspond to the fixed resistance $R_{fixed}$ being set to approximately $\frac{2}{3}$ of the resistance of the loop configuration corresponding to the peak result of the plot 1501. For a scale loop of the approximate configuration of the loop 1300 shown in FIG. 13, this corresponds to a connecting portion trace segment width which is roughly twice the coupling portion trace segment width at the peak result of the plot 1501.

The plots 1501, 1502 and 1503 show maximum values of the quantity related to signal coupling capability of the associated loop resistance configurations of 10.7, 9.0 and 6.6, respectively. These results indicate, to maintain the signal coupling capability of a scale loop, it is extremely advantageous to decrease the resistance of the trace segments of the connecting portion of a scale loop, for example, by increasing their width, as expected.

Thus, in various exemplary embodiments of the scale loops according to this invention, the connection portion trace segments of the scale loop have a width that is at least about the width of the coupling portion trace segment of the scale loop. In various other exemplary embodiments, the connection portion trace segments of the scale loop have a width that is greater than about 1.5 times the width of a coupling portion trace segment width.

Furthermore, the plots 1501, 1502 and 1503 show maximum values at trace width ratio values of approximately 0.65, 0.4 and 0.28, respectively. These results show that, as the resistance of the connecting portion trace segments of a scale loop is reduced, the trace width ratio corresponding to the best signal coupling capacity of the coupling portion of the scale loop increases. It should be appreciated that the previously discussed results of FIGS. 6, 10, 11, and 12 assume that the trace width of the connecting portion trace segments is the same as the trace width of the coupling portion trace segments.

Thus, according to the results shown in FIG. 15, to the extent that the resistance of the connecting portion trace segments of a scale loop is reduced by making the trace widths of these segments wider than the trace widths of the of the coupling portion trace segments, the trace width ratio corresponding to the best signal coupling capacity of the coupling portion of the scale loop will tend in the direction of the larger exemplary trace width values previously discussed.

In the previous discussion, relatively simple exemplary scale loops according to this invention have been characterized according to various trace width ratio values. However, it should be appreciated that in addition to the relatively simple scale loops shown in FIGS. 7, 8 and 13, scale loops may also be formed in a wide variety of other shapes according to this invention. Such shapes include, but are not limited to shapes comprising triangles, sinusoids, other curvilinear shapes, and combinations of such shapes. Furthermore, any shape of scale loop shape may employ either constant or varying widths along any or all scale loop trace segments. In such cases of complex scale loop shapes, each scale loop trace segment has one or more width dimensions along directions that run generally perpendicular to the direction of the scale loop trace at any point along the loop trace segment.

Furthermore, each scale loop has a first portion of its interior area that overlies a magnetic field generating region of an operably positioned readhead and a second portion of its interior area overlies a receiver region of the operably positioned readhead. The first and second portions of the interior areas each have respective maximum dimensions along a measuring axis and transverse to the measuring axis. In general, the least of these maximum overall dimensions can be used as the denominator of the exemplary trace width ratios discussed above and the scale loop trace widths of such complex loops may be determined accordingly in various exemplary embodiments. If any of the maximum overall dimensions of the first and second portions of the interior area along a measuring axis and transverse to the measuring axis are applicable only to trivial features of the first or second portions, then the maximum dimension of a non-trivial feature should be used instead.

Figures 16, 17:
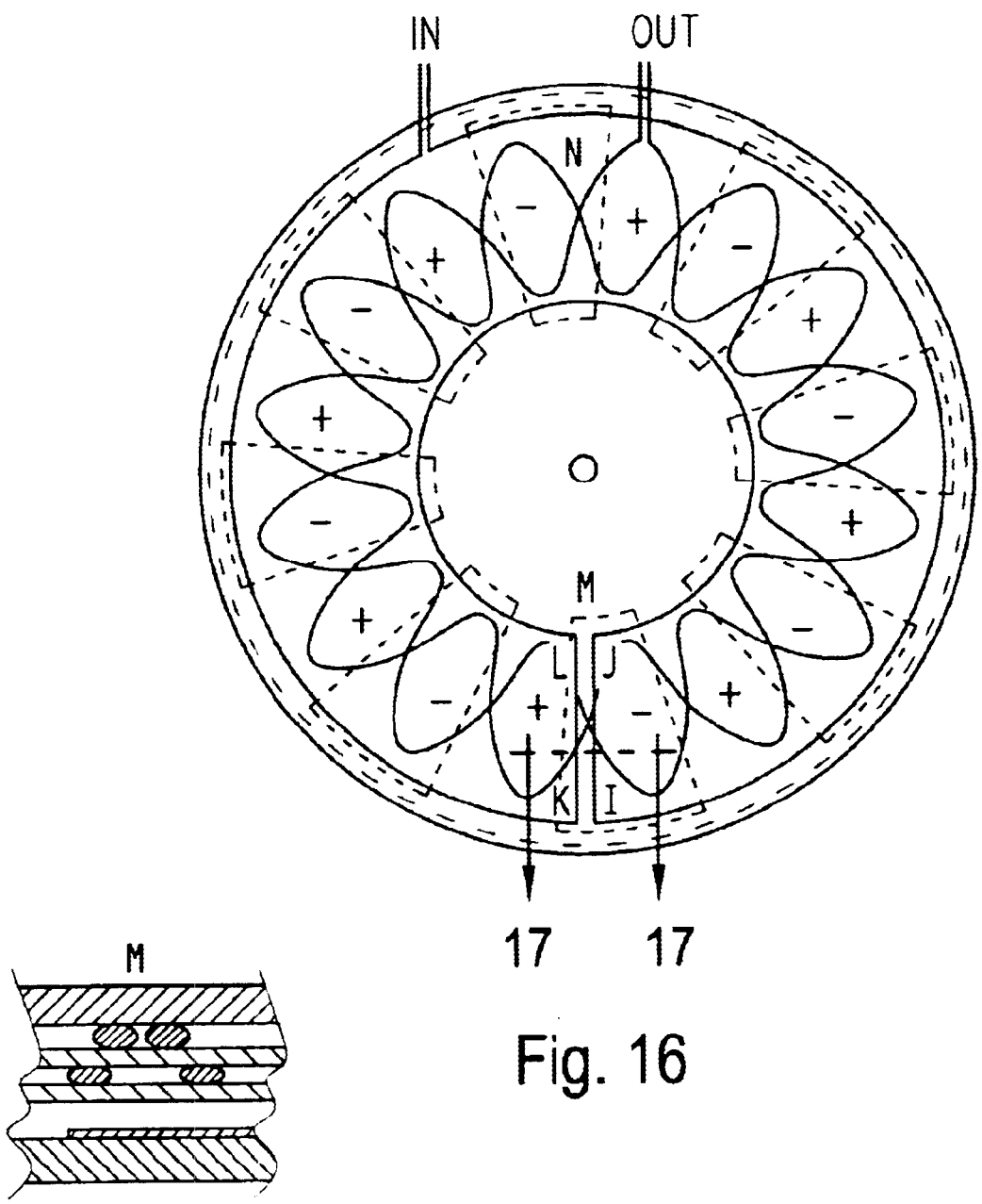
FIG. 16 is an induced-current transducer with a measurement axis extending in a circular path.
FIG. 17 is a cross-section of the induced-current transducer of FIG. 16.

It should be appreciated that, although the foregoing embodiments are shown as linear transducers, the designs are readily converted to rotary applications, according to the applicable teachings of the incorporated '389 patent. FIG. 16, for example, shows an induced-current position transducer, in which the measurement axis extends along a circular path. FIG. 16 corresponds to FIG. 16A of the incorporated '389 patent and is described therein. FIG. 17 shows the inductive scale element fixed to a relatively planar substrate. FIG. 17 corresponds to FIG. 16B of the incorporated '389 patent and is described therein. However, the substrate may also have a cylindrical geometry, approximately as shown and described with reference to FIGS. 18A–19B in the incorporated '389 patent. Furthermore, although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. One such appropriate signal processing technique is disclosed in reference to FIG. 21 of the incorporated '389 patent. Other applicable signal processing techniques will be apparent to those skilled in the art.

While this invention has been described in conjunction with the specific embodiments above, it is evident that many alternatives, combinations, modifications, and variations are apparent to those skilled in the art. Accordingly, the preferred embodiments of this invention, as set forth above are intended to be illustrative, and not limiting. Various changes can be made without departing from the spirit and scope of this invention.

What is claimed is:

1. A scale loop of an induced current position transducer, the scale loop comprising an interior area bounded by a conductive scale trace, the scale loop positionable along a measuring axis relative to an inductive position transducer readhead such that a first portion of the interior area overlies a magnetic field generating region on the readhead and a second portion of the interior area overlies a magnetic field sensing region on the readhead, each of the first and second portions having a set of characteristic dimensions comprising:

a maximum dimension parallel to the measuring axis; and
   a maximum dimension transverse to the measuring axis;
      wherein at least a portion of the scale loop trace has a width dimension that is at least about 0.2 times the least of the characteristic dimensions.

2. The scale loop of claim 1, wherein each maximum dimension is the maximum dimension of a non-trivial feature of the scale loop configuration.

3. The scale loop of claim 1, wherein the maximum dimension of the first portion transverse to the measuring axis is the width of the magnetic field generating region on the readhead.

4. The scale loop of claim 1, wherein the maximum dimension of the second portion transverse to the measuring axis is the width of the magnetic field sensing region on the readhead.

5. The scale loop of claim 1, wherein the entire scale trace has a width dimension which is at least about 0.2 times the least of the characteristic dimensions.

6. The scale loop of claim 5, wherein at least a portion of the scale trace has a width dimension which is at least about 0.3 times the least of the characteristic dimensions.

7. The scale loop of claim 6, wherein the entire scale trace has a width dimension which is at least about 0.3 times the least of the characteristic dimensions.

8. The scale loop of claim 7, wherein each portion of the scale trace which extends approximately transverse to the measuring axis and lies entirely within one of the magnetic field generating region and the magnetic field sensing region has a width dimension between about 0.3 and about 2.0 times the least of the characteristic dimensions.

9. The scale loop of claim 8, wherein each portion of the scale trace which extends approximately transverse to the measuring axis and lies entirely within one of the magnetic field generating region and the magnetic field sensing region has a width dimension between about 0.3 and about 1.5 times the least of the characteristic dimensions.

10. The scale loop of claim 9, wherein each portion of the scale trace which extends approximately transverse to the measuring axis and lies entirely within one of the magnetic field generating region and the magnetic field sensing region has a width dimension between about 0.3 and about 0.8 times the least of the characteristic dimensions.

11. The scale loop of claim 1, wherein a portion of the scale trace extending outside of the magnetic field generating region and the magnetic field sensing region has a width dimension exceeding the width of any portion of the scale trace lying entirely within one of the magnetic field generating region and the magnetic field sensing region.

12. The scale loop of claim 11, wherein the portion of the scale trace extending outside of the magnetic field generating region and the magnetic field sensing region comprises a portion of the scale trace lying in a region between the magnetic field generating region and the magnetic field sensing region.

13. The scale loop of claim 12, wherein the portion of the scale trace lying in the region between the magnetic field generating region and the magnetic field sensing region has a width dimension of at least about 1.5 times the width of any portion of the scale trace lying entirely within one of the magnetic field generating region and the magnetic field sensing region.

14. The scale loop of claim 1, wherein the measuring axis extends along a circular path.

15. The scale loop of claim 14, wherein the scale loop is fixed to a substrate which is one of relatively planar and relatively cylindrical.

16. A scale loop of an induced current position transducer, comprising:

a scale trace formed from an electrically conductive material, the scale trace fixed on a substrate, wherein:
   the scale trace is arranged in a continuous loop; and
   the scale trace has a maximum cross-sectional thickness between a top surface and a bottom surface of the scale trace along a direction approximately normal to the substrate, the maximum cross-sectional thickness at any point along the scale trace being at most 0.8 skin depths of the material at a frequency of operation of the induced current position transducer.

17. The scale loop of claim 14, wherein the maximum cross-sectional thickness is at most 0.6 skin depths of the material at a frequency of operation of the induced current position transducer.

18. The scale loop of claim 15, wherein the maximum cross-sectional thickness is between about 0.6 and about 0.3 skin depths of the material at a frequency of operation of the induced current position transducer.

19. A scale loop of an induced current position transducer, the scale loop comprising an interior area bounded by a conductive scale trace fixed on a substrate, the scale loop positionable along a measuring axis relative to an inductive position transducer readhead such that a first portion of the interior area overlies a magnetic field generating region on the readhead and a second portion of the interior area overlies a magnetic field sensing region on the readhead, each of the first and second portions having a set of characteristic dimensions comprising:

a maximum dimension parallel to the measuring axis; and a maximum dimension transverse to the measuring axis;

wherein the conductive scale trace has a cross-section that has a significant thickness in a direction normal to the substrate in comparison to its width parallel to the substrate; and at least a portion of the scale trace has a cross-sectional perimeter that is at least about 0.4 times the least of the characteristic dimensions.

20. A scale loop of an induced current position transducer, the scale loop comprising an interior area bounded by a scale trace formed from a conductive material fixed on a substrate, the scale loop positionable along a measuring axis relative to an inductive position transducer readhead such that a first portion of the interior area overlies a magnetic field generating region on the readhead and a second portion of the interior area overlies a magnetic field sensing region on the readhead, each of the first and second portions having a set of characteristic dimensions comprising:

a maximum dimension parallel to the measuring axis; and a maximum dimension transverse to the measuring axis;
  (a) at least a portion of the scale trace has a width dimension that is at least about 0.2 times the least of the characteristic dimensions and the scale trace has a cross-sectional thickness between a top surface and a bottom surface of the scale trace along the direction normal to the substrate, a maximum cross-sectional thickness at any point along the scale trace is approximately equal to or less than 3 skin depths of the material at a frequency of operation of the induced current position transducer; and
  (b) at least a portion of the scale trace has a cross-sectional perimeter that is at least about 0.4 times the least of the characteristic dimensions and the scale trace has a cross-section that has a significant thickness in a direction normal to the substrate in comparison to its width parallel to the substrate.

21. A scale loop of an induced current position transducer, the scale loop comprising an interior area bounded by a scale trace formed from an electrically conductive material, the scale loop positionable along a measuring axis relative to an inductive position transducer readhead such that a first portion of the interior area overlies a magnetic field generating region on the readhead and a second portion of the interior area overlies a magnetic field sensing region on the readhead, each of the first and second portions having a set of characteristic dimensions comprising:

a maximum dimension parallel to the measuring axis; and a maximum dimension transverse to the measuring axis;

wherein:
  at least a section of the scale loop trace has a width dimension that is at least about 0.2 times the least of the characteristic dimensions; and
  the scale trace has a maximum cross-sectional thickness between a top surface and a bottom surface of the scale trace along a direction approximately normal to the substrate, the maximum cross-sectional thickness at any point along the scale trace being approximately equal to or less than 3 skin depths of the material at a frequency of operation of the induced current position transducer.

22. The scale loop of claim 20, wherein the thickness at any point along the scale trace is at most 0.8 skin depths of the material at a frequency of operation of the induced current position transducer.

23. The scale loop of claim 20, wherein the thickness at any point along the scale trace is at most 0.6 skin depths of the material at a frequency of operation of the induced current position transducer.

24. The scale loop of claim 20, wherein the thickness at any point along the scale trace is between about 0.6 and about 0.3 skin depths of the material at a frequency of operation of the induced current position transducer.

25. The scale loop of claim 21, wherein the thickness at any point along the scale trace is at most 0.8 skin depths of the material at a frequency of operation of the induced current position transducer.

26. The scale loop of claim 21, wherein the thickness at any point along the scale trace is at most 0.6 skin depths of the material at a frequency of operation of the induced current position transducer.

27. The scale loop of claim 21, wherein the thickness at any point along the scale trace is between about 0.6 and about 0.3 skin depths of the material at a frequency of operation of the induced current position transducer.

* * * * *